United States Patent
Eisenzopf

(10) Patent No.: US 11,004,013 B2
(45) Date of Patent: May 11, 2021

(54) TRAINING OF CHATBOTS FROM CORPUS OF HUMAN-TO-HUMAN CHATS

(71) Applicant: discourse.ia, Inc., Dallas, TX (US)

(72) Inventor: Jonathan E. Eisenzopf, San Francisco, CA (US)

(73) Assignee: DISCOURSE.AI, INC., Dallas, TX (US)

(*) Notice: Subject to any disclaimer, the term of this patent is extended or adjusted under 35 U.S.C. 154(b) by 0 days.

(21) Appl. No.: 16/734,973

(22) Filed: Jan. 6, 2020

(65) Prior Publication Data
US 2020/0143288 A1  May 7, 2020

Related U.S. Application Data

(63) Continuation-in-part of application No. 16/210,081, filed on Dec. 5, 2018, and a continuation-in-part of application No. 16/201,188, filed on Nov. 27, 2018.
(Continued)

(51) Int. Cl.
  *G06N 20/00* (2019.01)
  *G06N 5/04* (2006.01)
  (Continued)

(52) U.S. Cl.
  CPC .......... *G06N 20/00* (2019.01); *G06N 3/006* (2013.01); *G06N 5/04* (2013.01); *G10L 15/1815* (2013.01);
  (Continued)

(58) Field of Classification Search
  USPC ..................................................... 704/1–504
  See application file for complete search history.

(56) References Cited

U.S. PATENT DOCUMENTS 8,346,563 B1 *  1/2013  Hjelm ................. G10L 15/1822
                                              704/275
8,407,049 B2 *  3/2013  Cromack .............. G06F 16/685
                                              704/235
(Continued)

FOREIGN PATENT DOCUMENTS

WO  2014069122 A1  8/2014
WO  2018067368 A1  4/2018

OTHER PUBLICATIONS

USPTO; Notice of Allowance on first Office Action, dated Sep. 15, 2020, in related U.S. Appl. No. 16/786,923, filed Feb. 10, 2020, by Jonathan E. Eisenzopf.
(Continued)

*Primary Examiner* — Marcus T Riley
(74) *Attorney, Agent, or Firm* — Robert H. Frantz

(57) ABSTRACT

Automated (autonomous) and computer-assisted preparation of initial training patterns for an Artificial Intelligence (AI) based automated conversational agent system, such as an AI-based chatbot, includes a computer processor accessing a corpus of digital weighted conversation models representing text-based interlocutory conversations, wherein each digital weighted conversation model contains annotations and paths, and wherein each path in each digital weighted conversation model is associated with a weight; selecting a plurality of the conversations which meet at least one criteria and in which at least one path meets at least one weight threshold according to the plurality of digital weighted conversation models; converting the weights associated with the selected conversations into initial training pattern values according to at least one Artificial Intelligence (AI) based automated conversational agent system; and exporting the training pattern values to at least one Artificial Intelligence (AI) based automated conversational agent system.

47 Claims, 17 Drawing Sheets

Related U.S. Application Data

(60) Provisional application No. 62/594,616, filed on Dec. 5, 2017, provisional application No. 62/594,610, filed on Dec. 5, 2017.

(51) Int. Cl.
  *G06N 3/00* (2006.01)
  *G10L 15/22* (2006.01)
  *G10L 15/18* (2013.01)
  *H04L 12/58* (2006.01)
  *G06Q 30/00* (2012.01)

(52) U.S. Cl.
  CPC .............. *G10L 15/22* (2013.01); *H04L 51/02* (2013.01); *G06Q 30/016* (2013.01); *G10L 2015/223* (2013.01)

(56) References Cited

U.S. PATENT DOCUMENTS

| | | | | |
|---|---|---|---|---|
| 8,706,472 | B2* | 4/2014 | Ramerth | G06F 40/53 704/2 |
| 8,719,200 | B2* | 5/2014 | Beilby | G09B 5/00 706/45 |
| 8,762,316 | B2* | 6/2014 | Jerram | G06Q 30/0256 706/46 |
| 9,129,601 | B2* | 9/2015 | Stent | G06F 40/12 |
| 9,189,742 | B2* | 11/2015 | London | G06N 5/04 |
| 9,300,790 | B2* | 3/2016 | Gainsboro | G10L 21/12 |
| 9,430,463 | B2* | 8/2016 | Futrell | G06F 40/194 |
| 9,569,743 | B2* | 2/2017 | Fehr | G06Q 30/016 |
| 9,575,936 | B2* | 2/2017 | Romano | G06F 40/109 |
| 9,621,713 | B1* | 4/2017 | Gainsboro | H04M 3/42221 |
| 9,740,677 | B2* | 8/2017 | Kim | G06F 40/20 |
| 9,966,065 | B2* | 5/2018 | Gruber | G10L 15/28 |
| 10,169,329 | B2* | 1/2019 | Futrell | G06F 40/30 |
| 10,269,345 | B2* | 4/2019 | Castillo Sanchez | G10L 13/08 |
| 10,296,160 | B2* | 5/2019 | Shah | G06F 40/295 |
| 10,331,791 | B2* | 6/2019 | Anbazhagan | G06F 8/30 |
| 10,354,677 | B2* | 7/2019 | Mohamed | G10L 25/63 |
| 10,452,783 | B2 | 10/2019 | Pasupalak et al. | |
| 10,599,885 | B2* | 3/2020 | Galitsky | G06F 40/216 |
| 2007/0071206 | A1* | 3/2007 | Gainsboro | G10L 25/63 379/168 |
| 2009/0306981 | A1* | 12/2009 | Cromack | G06F 16/685 704/235 |
| 2014/0129418 | A1* | 5/2014 | Jerram | G10L 25/27 705/37 |
| 2014/0244249 | A1* | 8/2014 | Mohamed | G10L 25/63 704/233 |
| 2015/0066479 | A1 | 3/2015 | Pasupalak et al. | |
| 2015/0142704 | A1* | 5/2015 | London | G06F 40/58 706/11 |
| 2015/0161521 | A1* | 6/2015 | Shah | G06F 3/0481 706/12 |
| 2015/0222752 | A1* | 8/2015 | Fehr | G06Q 30/016 379/88.01 |
| 2016/0019885 | A1* | 1/2016 | Romano | G06F 40/109 704/9 |
| 2018/0143967 | A1* | 5/2018 | Anbazhagan | G10L 15/183 |
| 2019/0043106 | A1 | 2/2019 | Talmor et al. | |
| 2019/0171712 | A1* | 6/2019 | Eisenzopf | G06F 40/30 |
| 2019/0188590 | A1 | 6/2019 | Wu et al. | |
| 2019/0311036 | A1 | 10/2019 | Shanmugam et al. | |
| 2020/0143288 | A1* | 5/2020 | Eisenzopf | H04L 51/02 |
| 2020/0175964 | A1* | 6/2020 | Eisenzopf | H04L 51/02 |
| 2020/0265339 | A1* | 8/2020 | Eisenzopf | G06N 5/04 |

OTHER PUBLICATIONS

USPTO; First Office Action dated Aug. 14, 2020 in related U.S. Appl. No. 16/201,188, filed Nov. 27, 2018, by Jonathan E. Eisenzopf.

Eisenzopf, Jonathan E.; Applicant's Reply filed on Sep. 25, 2020 to first Office Action in related U.S. Appl. No. 16/201,188, filed Nov. 27, 2018, by Jonathan E. Eisenzopf.

Machine Translation (partial) of WO2014069122A1 retrieved from http://patents.google.com/patent on Sep. 7, 2018.

Ang, J., et al.; "Automatic Dialog Act Segmentation and Classification in Multiparty Meetings,"; date unknown.

Dunne, J. et al.; "Hello & Goodbye: Conversation Boundary Identification Using Text Classification"; 2018.

Galley, M. et al.; "Discourse Segmentation of Multi-Party Conversation"; date unknown.

Garreta, Raul; How to create text classifiers with Machine Learning, retrieved on Sep. 7, 2018 from https://monkeylearn.com/blog.

Hsueh, P-Y. et al; "Automatic Segmentation of Multiparty Dialogue"; date unknown.

Joty, S. et al.; "Topic Segmentation and Labeling in Asynchronous Conversations"; 2013.

Joty, S. et al.; "Supervised Topic Segmentation of Email Conversations"; 2011.

Michiels, Eric; "Modelling Chatbots with a Cognitive System Allows for a Differentiating User Experience"; 2017.

Olofsson, N. et al.; "A Machine Learning Approach to Dialogue Act Classification in Human-Robot Conversations"; date unknown.

Morchid, M. et al.; "Improving Dialogue Classification using a Topic Space Representation and a Gaussian Classifier Based on the Decision Rule"; date unknown.

Purver, M.; "Topic Segmentation", date unknown.

Ries, K; "Segmenting Conversations by Topic, Initiative and Style"; 2001.

Roth, Ben.; "Topic Extraction and Relation in Instant Messaging"; 2010.

Stewart, Robin S.; "Automatic Identification of Off-Topic Regions of Conversations"; 2006.

Weisz, Justin; "Segmentation and Classification of Online Chats"; date unknown.

Wikipedia; "Dialog act"; retrieved on Sep. 18, 2018 from https://en.wikipedia.org/wiki/Dialog_act.

Consumers Advocate; "Clientgo Chatbot Review ", retrieve don Dec. 17, 2019 from https://www.consumersadvocate.org.

Consumers Advocate; "10 Best Chatbots of 2020 ", retrieved on Dec. 17, 2019 from https://www.consumersadvocate.org.

Consumers Advocate; "Botique.ai Review ", retrieved on Dec. 17, 2019 from https://www.consumersadvocate.org.

Consumers Advocate; "Ada Chatbot Review", retrieved on Dec. 17, 2019 from https://www.consumersadvocate.org.

Consumers Advocate; "LiveChat Chatbot Review", retrieved on Dec. 17, 2019 from https://www.consumersadvocate.org.

Consumers Advocate; "Amzaon Lex Chatbot Review", retrieved on Dec. 17, 2019 from https://www.consumersadvocate.org.

Consumers Advocate; "Bold Chatbot Review ", retrieved on Dec. 17, 2019 from https://www.consumersadvocate.org.

Consumers Advocate; "IBM Watson API Chatbot Review", retrieved on Dec. 17, 2019 from https://www.consumersadvocate.org.

Consumers Advocate; "Hubspot Chatbots Review", retrieved on Dec. 17, 2019 from https://www.consumersadvocate.org.

Consumers Advocate; "Heyday Chatbots Review", retrieved on Dec. 17, 2019 from https://www.consumersadvocate.org.

Consumers Advocate; "Dialogflow Chatbot Review", retrieved on Dec. 17, 2019 from https://www.consumersadvocate.org.

Consumers Advocate; "Reve Chatbot Review", retrieved on Dec. 17, 2019 from https://www.consumersadvocate.org.

Deshpande; "How I used deep learning to train a chatbot to talk like me (sorta)", retrieved on Dec. 17, 2019 from https://adeshpande3.github.io.

Udemy; "Deep Learning and NLP A-Z [TM]: How to create a ChatBot", retrieved on Dec. 17, 2019 from https://www.udemy.com.

Sutskever, Hya, et al.; "Sequence to Sequence Learning with Neural Networks", NIPS'14: Proceedings of the 27th International Conference on Neural Information Processing Systems, Dec. 2014, vol. 2, pp. 3104-3112.

Drift; "An introduction to A.I. Chatbots", retrieved from https://www.drift.com/learn/chatbot/ai-chatbots/ on Dec. 17, 2019.

(56) References Cited

OTHER PUBLICATIONS

Knight, Chris; "How to teach your chatbot with training data"; Mar. 23, 2018, retrieved on Dec. 17, 2019 from https://chatbotslife.com.

* cited by examiner

TRAINING OF CHATBOTS FROM CORPUS OF HUMAN-TO-HUMAN CHATS

INCORPORATION BY REFERENCE

U.S. patent application Ser. No. 16/201,188, which was filed on Nov. 27, 2018and Ser. No. 16/210,081, which was filed on Dec. 5, 2018, both filed by Jonathan E. Eisenzopf, are hereby incorporated by reference in their entireties, including figures.

FIELD OF THE INVENTION

This non-provisional continuation-in-part patent application claims benefit of the filing dates of U.S. non-provisional patent application Ser. No. 16/201,188, which was filed on Nov. 27, 2018entitled "Improvements to Computer-based Interlocutor Understanding Using Classifying Conversation Segments," and Ser. No. 16/210,081, which was filed on Dec. 5, 2018, entitled "Improvements to Computer-based Understanding of Customer Behavior Patterns for Better Customer Outcomes", which claimed benefit of the filing dates of provisional patent applications 62/594,610, filed on Dec. 5, 2017, and 62/594,616, filed on Dec. 5, 2017, respectively, all filed by Jonathan E. Eisenzopf. The present invention relates to certain improvements of computer functionality to training automated chatbots based on a corpus of historical, recorded human-to-human text-based interactions.

BACKGROUND OF INVENTION

Online conversational text-based communication and interaction systems are growing in popularity as clients of business entities expect to be able to "chat" with business representatives via websites and smartphone application programs at any time of day, any day of the week, any time of year. It was estimated by consulting firm Deloitte in 2017 that 76% of customer interactions occur through conversations, but that 50% of those conversations fail to meet customer expectations, which was estimated to result in $1.6 trillion lost in global revenue annually due to the poor customer experience from these conversations according to the eleventh annual Accenture Global Consumer Pulse Survey in 2016.

It is expected by some industry analysts that Artificial Intelligence (AI) can be leveraged to automate a large portion of these conversations, especially through chatbot platforms. The McKinsey Global Institute predicted in 2018 that AI-based conversation platforms that utilize manually supervised deep-learning technology with training from at least 10 million labeled conversation examples would match or exceed the success rate of human-to-human conversations.

SUMMARY OF THE EXEMPLARY EMBODIMENTS OF THE INVENTION

Systems and processes for automated (autonomous) and computer-assisted preparation of initial training patterns for an Artificial Intelligence (AI) based chatbot are disclosed which include a computer processor accessing a corpus of digital weighted conversation models representing text-based interlocutory conversations, wherein each digital weighted conversation model contains annotations and paths, and wherein each path in each digital weighted conversation model is associated with a weight; selecting a plurality of the conversations which meet at least one criteria and in which at least one path meets at least one weight threshold according to the plurality of digital weighted conversation models; converting the weights associated with the selected conversations into initial training pattern values according to at least one Artificial Intelligence (AI) based automated conversational agent, such as a chatbot; and exporting the training pattern values to the least one Artificial Intelligence (AI) based automated conversational agent.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF ONE OR MORE EXEMPLARY EMBODIMENT(S) OF THE INVENTION

Figure 1:
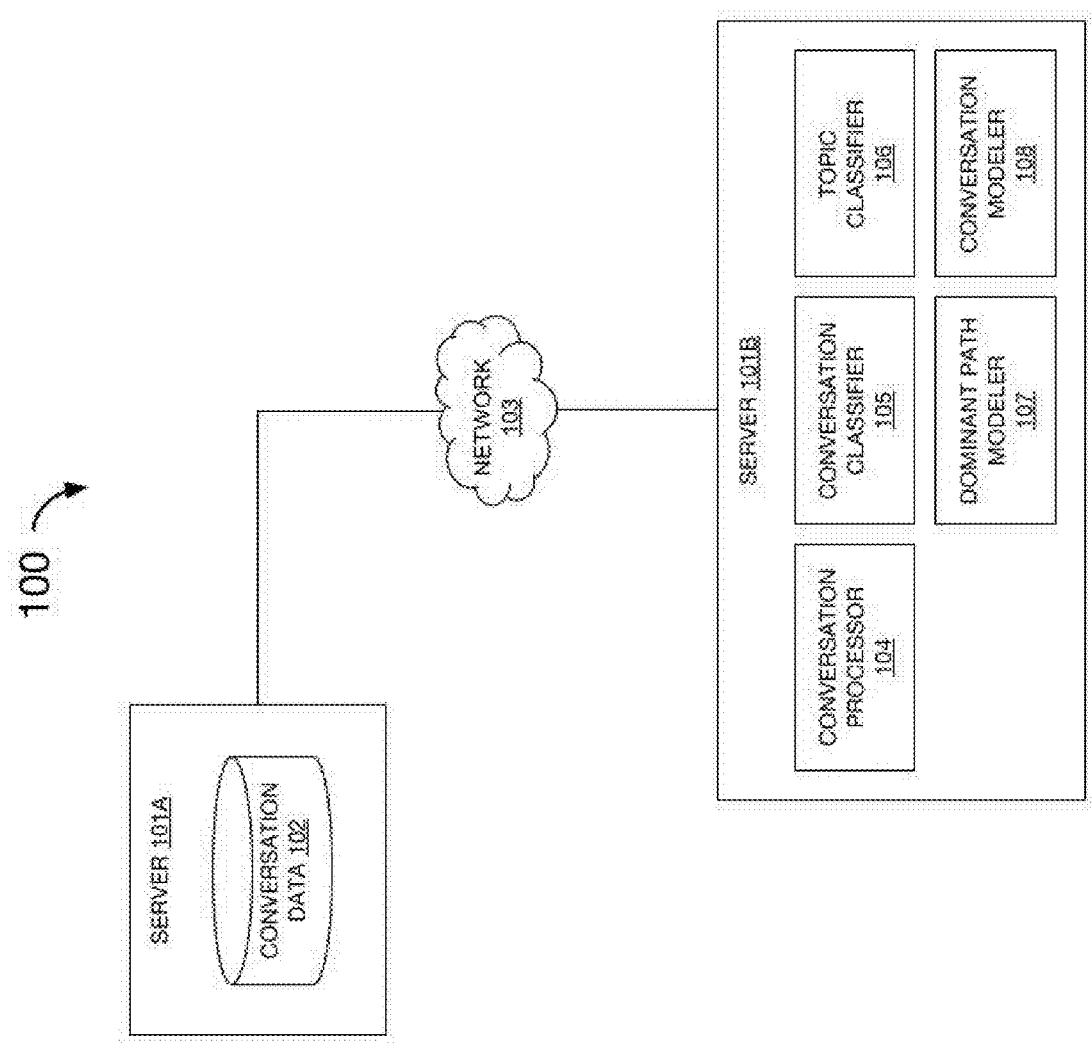
FIG. 1 depicts an improved data processing system and its related components according to at least one embodiment of the invention disclosed in the related and incorporated U.S. patent application Ser. No. 16/201,188.

The present inventor(s) have recognized that to manually annotate (label) large collections of text-recorded conversations for the purposes of training an AI-based automated conversational agent, such as a chatbot, is extremely time consuming and prohibitively expensive. For example, to label each text-recorded conversation in a collection of 10 million examples, assuming a $2 to $5 cost to label each text-recorded conversation, would require 3-6 months to complete at a cost of $20M to $50M. This per-conversation cost assumption is very low, however, and in-house, domestic labor costs could double or triple this cost if not outsourced to a lower-cost economy.

Therefore, per the inventors' recognition of this unmet need in the relevant arts, the inventors have set out to develop a more efficient technology to label conversations and to train automated conversational agent servers using a corpus of text-recorded human-to-human conversations. The generated training data can be equally well exported to and imported by AI-based automated conversational agent system including, but not limited to, chatbots, interactive voice response (IVR) systems, voicebot, prompts, entities, slots and flows. For the purposes of this disclosure, example embodiments of the present invention will be set forth relative to realization for training AI-based automated chatbots, however, those ordinarily skilled in the art will recognized that the invention is not limited to this type of training and can equally well be used to train other AI-based automated conversation agent systems.

The related and incorporated two patent applications provide useful technologies and processes to accomplish some of this functionality, so the teachings of those two patent applications are reviewed in the following paragraphs prior to delving into details of training chatbots using a corpus of interpersonal conversations. It should be noted, however, that although the present invention is disclosed in relationship to these two related patent applications, other embodiments of the present invention may be realized using similar functionality and similar data output from other products and systems, and that the present invention is not limited to utilization with and integration to only systems that implement the inventions described in the two related and incorporated patent applications.

Conversation Segment Classification

At least one of the present inventors realized, as disclosed in the related and incorporated U.S. patent application Ser. No. 16/201,188, hereinafter referred to as the '188 related invention or '188 related patent application, that there was an unmet need in the art of computing and user interfaces to enable a conversational interface through a digital virtual assistant such as a Chat Bot (automated text chat process). Certain improvements were disclosed in the related and incorporated U.S. patent application Ser. No. 16/201,188 that improved the ease of use of such user interfaces while simultaneously improving the utilization of computing resources such as memory footprint, processing bandwidth, and communications bandwidth to yield higher levels of simultaneously-served users by a single computing platform, thereby reducing the cost of the service to the operator.

The '188 related invention provides certain enhancements and improvements to a data processing system that processes audio, text and/or visual input for a computer interlocutor by creating and using a computer-based and computer-maintained conversation model comprising a plurality of topics comprising a plurality of probable inputs and outputs of a conversation based on a plurality of recorded conversations between a plurality of interlocutors.

The computer interlocutor, according to the '188 related invention, resides on a computer with attached storage and memory that contains one or more processing units. The computer interlocutor creates responses displayed via an output mechanism such as a an attached computer monitor or embedded visual screen or audio speaker attached to or embedded in the computer or computing device based on matching user inputs from an input device such as a connected keyboard or microphone attached to a computer or computing device.

Computer-based natural language understanding of input and output for a computer interlocutor is improved using a method, disclosed herein, of classifying conversation segments, which includes one or more of the following computer-performed actions, steps or processes:

a. receiving conversation data from transcribed conversations, such as between two people, an online chat or a text messaging system, a speech recognition system, or a chatbot or voicebot system;

b. splitting transcribed conversations into groups related to a conversation ontology using metadata; identifying dominant paths of conversational behavior by counting the frequency of occurrences of the behavior for a given path;

c. creating a conversation model comprising conversation behaviors, metadata, and dominant paths;

d. using the conversation model to assign a probability score for a matched input to the computer interlocutor or a generated output from the computer interlocutor.

e. receiving a plurality of transcribed conversations comprising a plurality of topics comprising a plurality of inputs and outputs by the interlocutors;

f. accessing and using for rule-based decision making a plurality of metadata related to a plurality of conversations, topics, interlocutors, or related computer systems;

g. receiving conversation data from transcribed conversations between one or more of people, an online chat or a text messaging system, a speech recognition system, and a chatbot or voicebot system (in some embodiments, some users' paths may be given more weight than other users);

h. splitting a plurality of transcribed conversations into a plurality of groups related to a conversation ontology using a plurality of metadata;

i. identifying a plurality of dominant paths comprising a plurality of conversational behavior by counting the frequency of occurrences of said behavior for a given path;

j. creating a conversation model comprising plurality of conversation behaviors, metadata, and dominant paths; and k. accessing and using for rule-based decision making the conversation model to assign a probability score for a matched input to the computer interlocutor or a generated output from the computer interlocutor.

Referring now to FIG. 1, an exemplary improved networked computer environment 100 is depicted according to the '188 related invention. The conversation classifier server 101B is connected to a network 103 and configured such that is it capable of storing and running one or more of the following: a conversation processor 104, a conversation classifier 105, a topic classifier 106, a dominant path modeler 107, and a conversation modeler 108, each of which may be realized by a processor running computer instructions, specialized electronic hardware circuits, or a combination of both. In this exemplary embodiment, another computer 101A is also connected to the computer communications network 103 and contains conversation data 102, which consists of transcribed conversations between two or more human and/or computer interlocutors. In some embodiments, at least one of the interlocutors may be interfaced via an application programming interface (API). In some embodiments, all of the interlocutors may be conducting a dialog within one computer.

Figure 2:
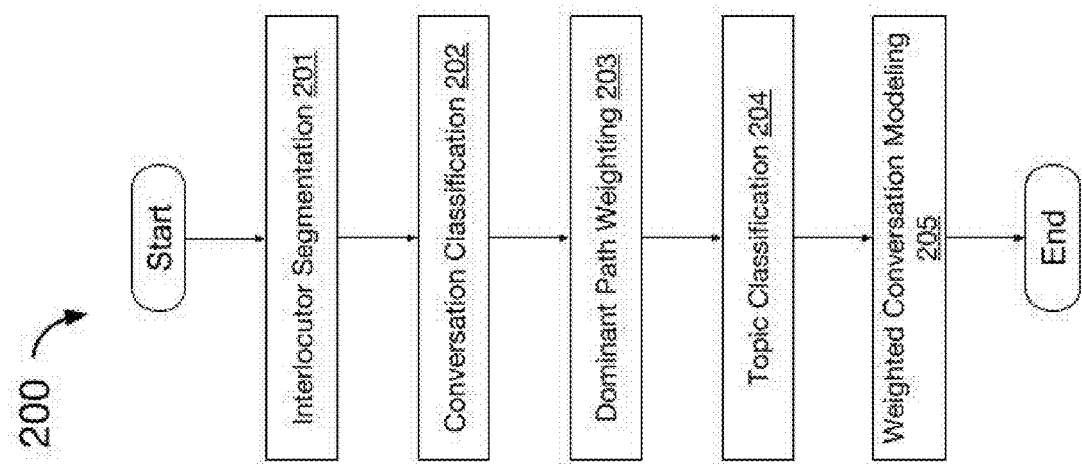
FIG. 2 depicts one or more methods according to the invention disclosed in the related and incorporated U.S. patent application Ser. No. 16/201,188 performed by the improved data processing system to classify a plurality of conversation transcriptions between two or more interlocutors.

Referring now to FIG. 2, exemplary methods used by the data processing system 100 to classify a plurality of conversation transcriptions from conversation data 102 between two or more interlocutors 200 are set forth further reference the exemplary arrangement of computing systems as shown in FIG. 1. The first step of the process is to segment the conversation transcript into turns further categorized by interlocutor 201 which is performed, for example, by the conversation processor 104 and further illustrated in FIG. 3. The conversation is further classified 202 according to a conversation ontology 700 according to conversation class 304. In at least one embodiment, the segmenting of a conversation transcript may be performed manually, according to the conversation ontology described herein, or may be performed at least if not entirely automatically using available third-party dialog act processing systems with suitable control parameters.

Next, conversations are weighted 203 according to the number of path traversals, which is performed, for example, by the dominant path modeler 107. Following the previous step, the data processing system performs topic classification 204 using the topic classifier 106. Topic classification can be performed automatically (unsupervised) using techniques such as keyword analysis thesauri, and natural language processing. Finally, the improved data processing system creates 205 a weighted conversation model 600 as further illustrated by FIG. 6 which can be used by a plurality of computer interlocutor systems to improve input and output performance in a number of ways, including but not limited to:

(a) allowing for predictive responses by automated systems in order to handle transactions faster, thereby reducing the computer resources consumed by aggregate transactions and allowing more transactions to by handled by the same amount of hardware;

(b) supporting optimized product design and upgrades by identifying and automating the most likely conversation behaviors to target in resource reduction (decrease response time, reduce memory footprint, reduce processor burden, reduce communications bandwidth, etc.); and (c) increasing customer affinity for interacting with automated systems by reducing delays between conversation turns which are otherwise unnatural delays when two humans are conversing.

Figure 3:
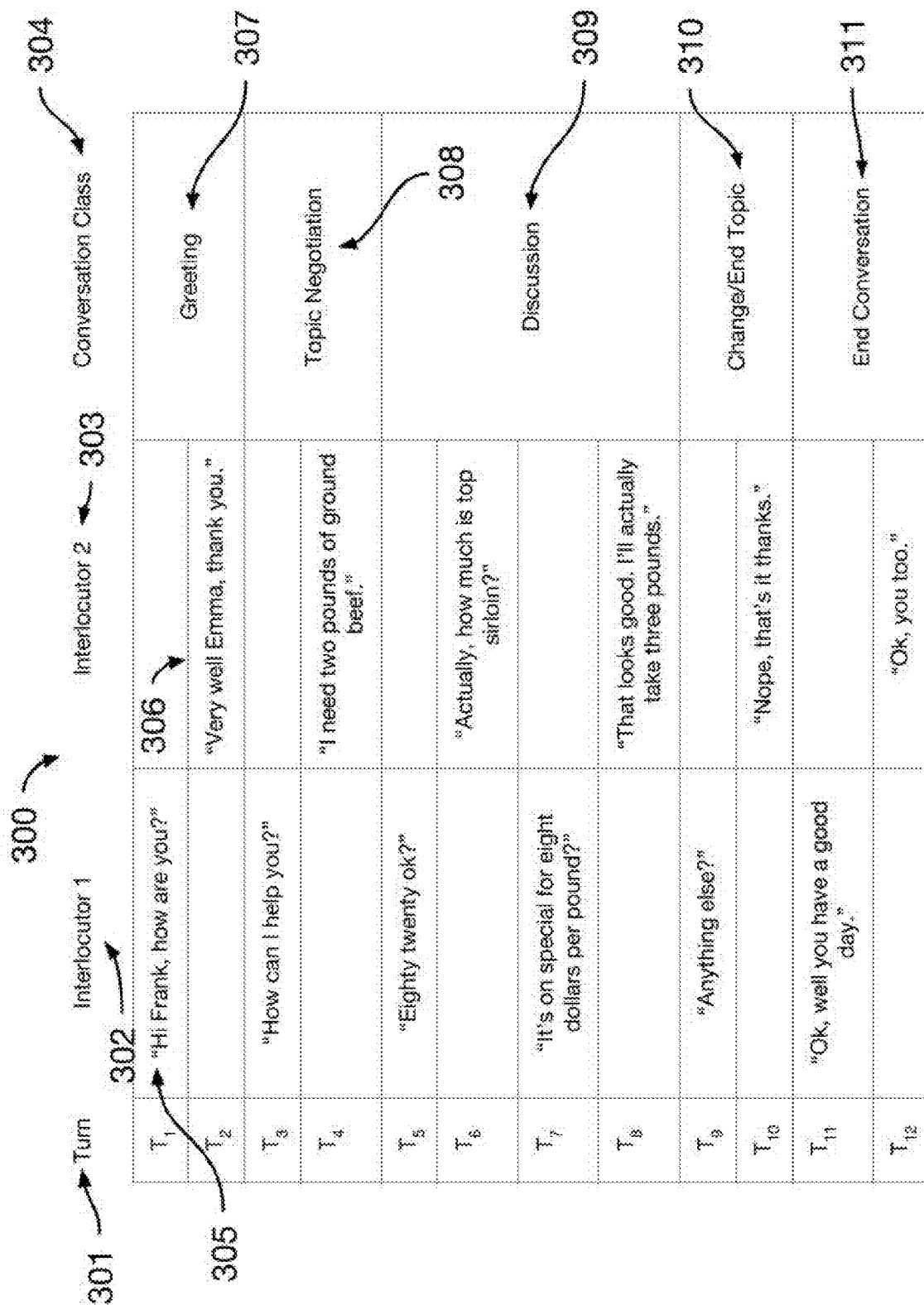
FIG. 3 illustrates an exemplary conversation classification method including splitting a plurality of transcribed conversations between multiple interlocutors into a plurality of conversation segments.

FIG. 3 illustrates an exemplary embodiment 300 of a method for a dominant path weighting 203 and output of the conversation classifier 105. This example includes a series of conversation turns $T_1$-$T_{12}$ 301 by an interlocutor 302 and another interlocutor 303 and further classified into conversation classes 304 which correspond to a conversation ontology 700 as further illustrated in FIG. 7.

The conversation classifier 105 works by examining the text from the interlocutor 305 comprising a turn 301 and further examines the second interlocutor's text 306, which, together and with processing of subsequent text including the turns of the interlocutors, classifies the turns into a conversation class 304. Illustrative of this figure, the conversation classes are greeting 307, topic negotiation 308, discussion 309, change/end topic 310, and end conversation 311.

Figure 4:
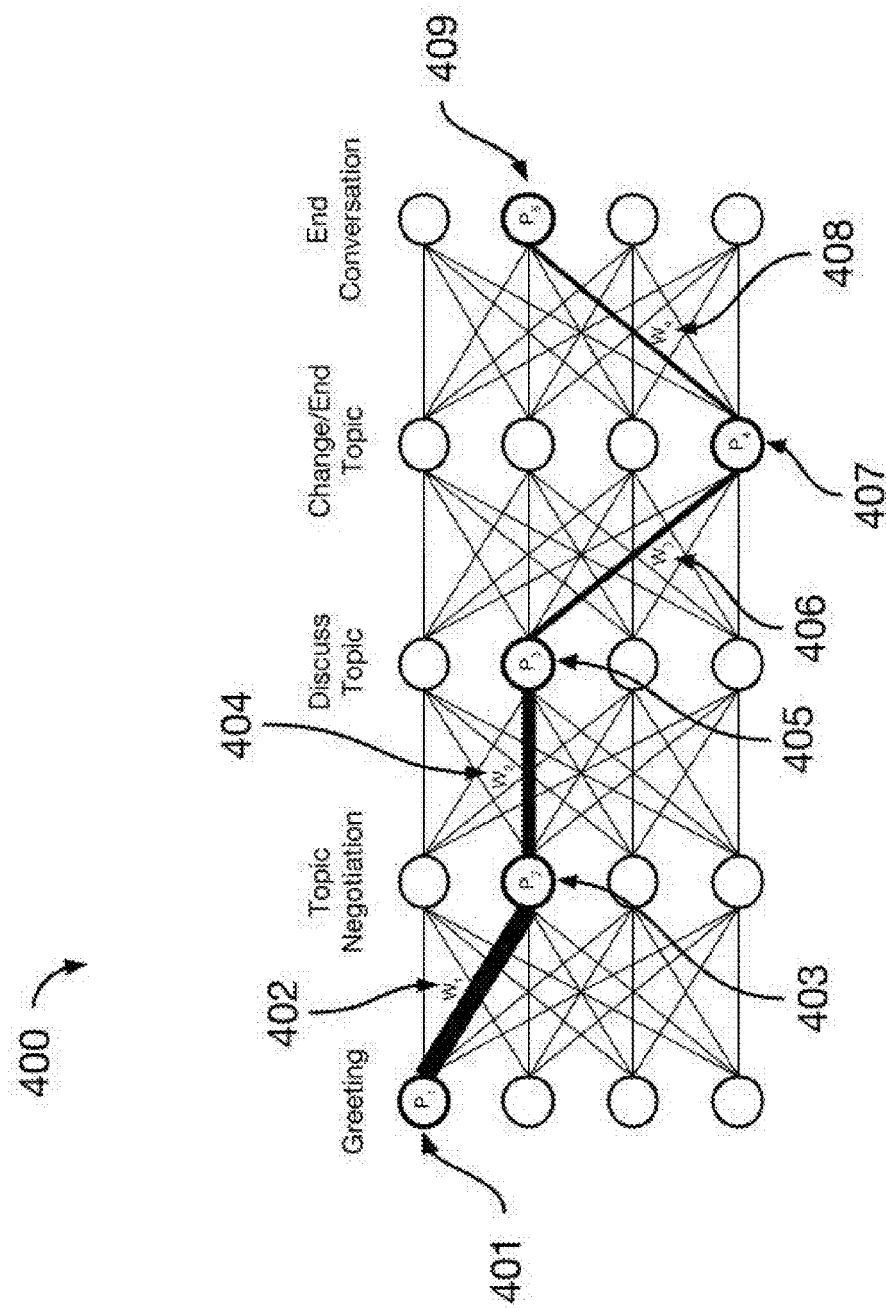
FIG. 4 shows an exemplary embodiment of a method for dominant weighting for a dominant path modeler.

FIG. 4 shows, using a Sankey-like diagram, an exemplary 400 dominant weighting method 203 used, for example, by the dominant path modeler 107 of data processing system 100 based on a plurality of segmented transcribed conversations processed by, for example, the conversation classifier 105 as depicted in FIG. 3. FIG. 4 further illustrates a highlighted dominant path example as produced by the dominant weighting method 203 comprised of a plurality of classified conversations 300. The dominant path model 400 is created, for example, by the dominant path modeler 107. Each step in the dominant path may be representative of a conversation class (304), an interlocutor input, or additional metadata identified by the dominant path modeler. FIG. 4 illustrates a dominant path model and may include a greeting 401, a topic negotiation 403, a topic discussion 405, a change or end of topic 407, and an end of conversation 409 steps (path nodes). The illustrated lines between each element of the dominant path represent the sum of plurality of conversations that traverse each path. The lines or weights (402, 404, 406, and 408) between steps in the paths represent the sums $W_1$-$W_N$ of traversals between steps in the dominant path.

Figure 5:
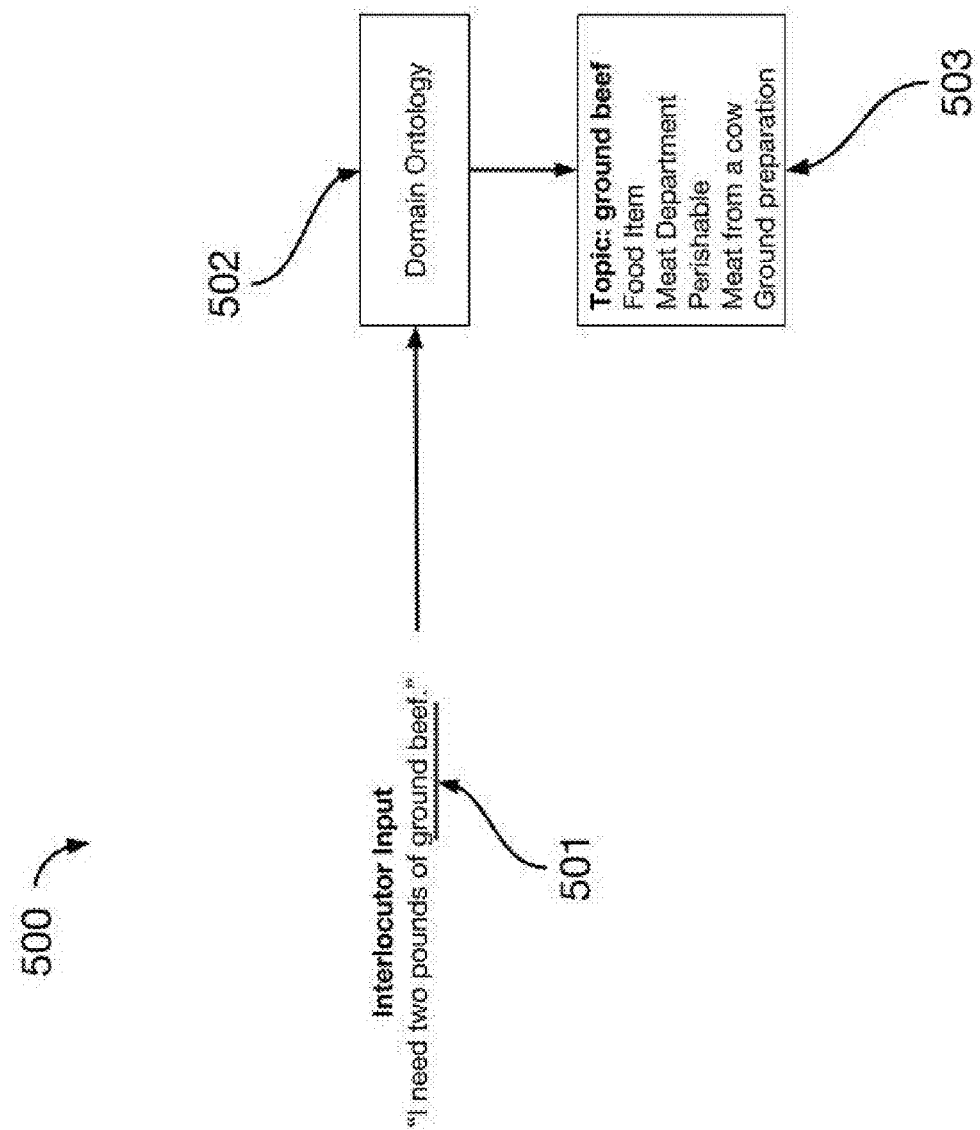
FIG. 5 illustrates an exemplary topic classification method used by a topic classifier to identify the correct topic of conversation.

FIG. 5 depicts 500 an exemplary topic classification method 204 used, for example, by the topic classifier 106 of data processing system 100, and is used to identify the correct topic of conversation based on a plurality of segmented conversations 300 including a plurality of topic negotiation segments 308. FIG. 5 further includes matching interlocutor inputs 501 to a plurality of topics in a plurality of domain ontologies 502 which returns the resulting metadata associated with a plurality of matching topics 503 to, for example, the topic classifier 106.

Figure 6:
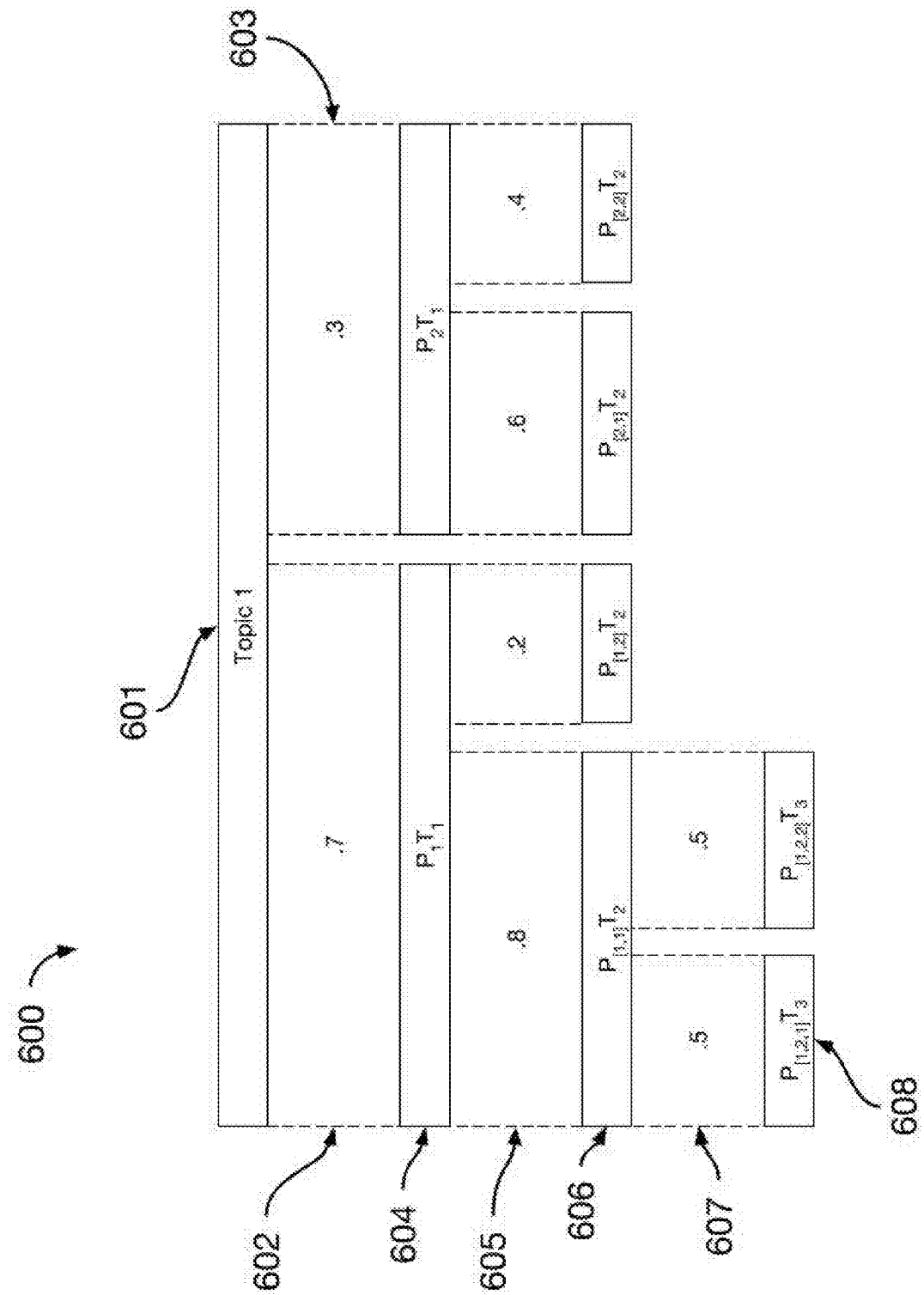
FIG. 6 depicts an exemplary weighted conversation model using a weighted conversation model.

FIG. 6 depicts an exemplary weighted conversation model 600 which is recorded in computer memory in an improved data structure and produced, for example, by the conversation modeler 108 of the data processing system 100, using, for example, the weighted conversation modeling method 205 from a plurality of transcribed conversations for a plurality of identified topics 500. FIG. 6 is illustrative of the weighted conversation modeling method 205 which is produced by the conversation modeler 108 and includes a topic 601 and a plurality of weights 602, 603, 605, 607 associated with a plurality of conversation paths and turns 604, 606, 608. The method of the '188 related invention uses the output of, for example, the dominant path modeler 107 and its associated dominant path weighting method 203 and as previously illustrated in FIG. 4 as input.

Each path segment $P_1$-$P_N$ between turns $T_1$-$T_N$ from a given dominant path model 400 and its associated weights $W_1$-$W_N$ are converted to a corresponding weight in the conversation model 600 such that the percentage of conversation traversals are represented as a percentage of the total traversals from the plurality of processed conversations.

For this present illustration, given a topic 601, weight 602 represents the percentage of processed conversations that have traversed the path $P_x$ for the interlocutor turn $T_y$. Further, weight 603 represents a second dominant path weighting with its associated path and interlocutor turn. Further weights for turns by the interlocutors are similarly represented by 605, 606, 607, and 608 as prescribed by the conversation segments, paths and weights contained in the dominant path model 400. The resulting conversation model as illustrated by FIG. 6 and its associated weights can then be used as by a method to predict the next most likely step in a conversation based upon the current position in the conversation model.

Figure 7:
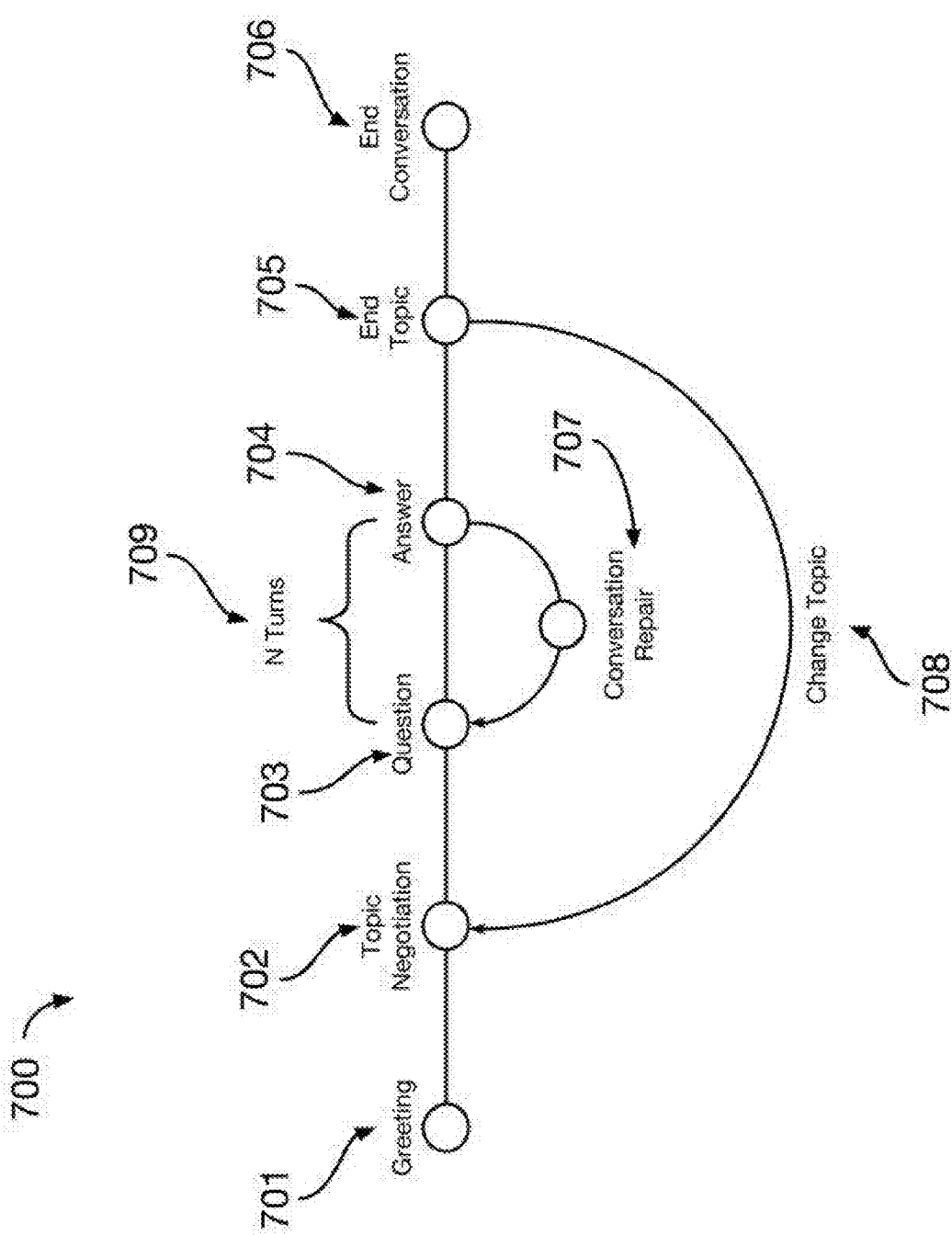
FIG. 7 sets forth an exemplary conversation ontology used to for rule-based decision making to split transcribed conversations into segments for classification by the improved data processing system as disclosed in the related and incorporated U.S. patent application Ser. No. 16/201, 188.

Referring now to FIG. 7, an exemplary conversation ontology is shown using a steampipe-like diagram, which may consist of entities including a greeting 701, topic negotiation 702, a discussion about a topic comprised of a series of turns 709 between the interlocutors that may contain a corresponding question 703 and answer followed by an end 705 or change of topic 708 followed by an end of conversation 706. Conversation repair 707 occurs within a topic when one or both interlocutors exchange turns during which the initial or earlier topic is finetuned or further refined, but not entirely changed from one domain to another. A plurality of conversation ontologies may be used by the data processing system 100 and one or more of the corresponding methods 200 of the system. Further, an ontology 700 is specifically utilized by the conversation classifier 105 and the associated method conversation classification 203 and as further illustrated by FIG. 3 to segment a plurality of conversations into conversation classes 304.

Figure 8:
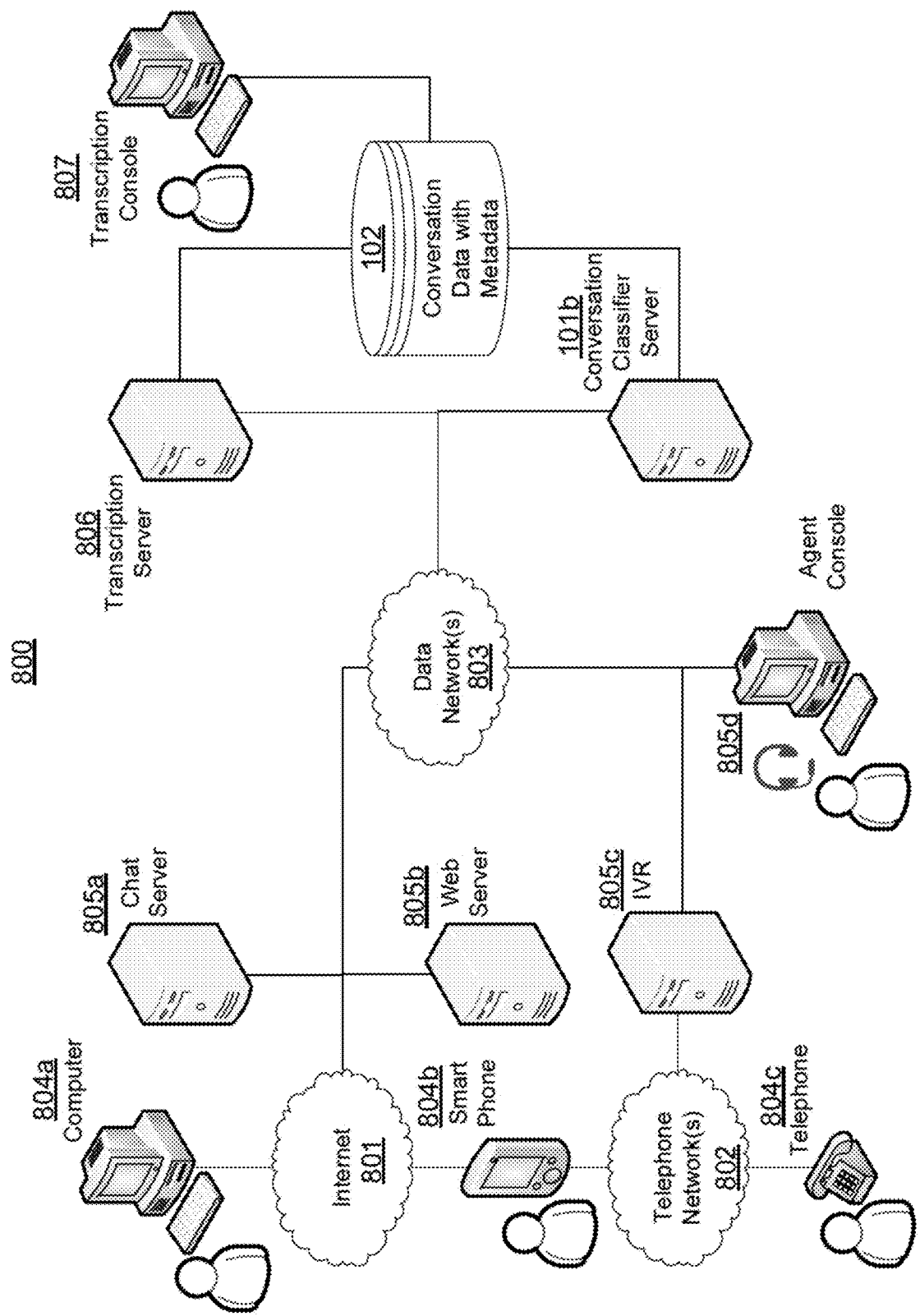
FIG. 8 illustrates an exemplary arrangement of computers, devices, and networks according to at least one embodiment of the invention disclosed in the related and incorporated U.S. patent application Ser. No. 16/201,188.

Referring now to FIG. 8, an exemplary arrangement 800 of computers, devices, and networks according to at least one embodiment of the '188 related invention is shown. A variety, but not exhaustive collection, of interlocutor types are shown, including a computer 804a, such as a personal computer or tablet computer, a smart cellular telephone 804b, a traditional telephone 804c, a chat server 805a, a web server 805b, an interactive voice response (IVR) system 805c, and an agent console 805d, which are interconnected via one or more wired or wireless telephone networks 801, data networks 803, and an internet 801. Two more or more of the interlocutor devices can carry on a dialog or conversation, which can be processed according to the forgoing descriptions. This analysis, as described, yields conversation data with metadata 102, which is created via supervised conversation analysis 807, automated conversation analysis 806, or a combination of both. The conversation classifier server 101b then communicates via appropriate data networks to access the conversation data 102 and perform the forgoing dominant path analysis.

The preceding example logical processes may include computer processing hardware to embody systems according to the '188 related invention; may be coupled with tangible, computer readable memory devices to realize computer program products according to the '188 related invention; and may be embodied as a machine logic method.

The '188 related invention may be realized for many different processors used in many different computing platforms, including but not limited to "Personal Computers" and web servers, running a popular operating systems such as Microsoft™ Windows™ or IBM™ AIX™, UNIX, LINUX, Google Android™, Apple iOS™, and others, to execute one or more application programs to accomplish the computerized methods described herein, thereby providing the improvement to the computer platform as set forth herein.

Dominant Path Analysis and Determination

At least one of the present inventors realized, as disclosed in the related and incorporated U.S. patent application Ser. No. 16/210,081, hereinafter referred to as the '081 related invention or '081 related patent application, that there was an unmet need in the art of computer-assisted business process analysis. Certain improvements we disclosed in the '081 related patent application improved the computer-based analysis tools through particular user interface enhancements and logical process improvements, while simultaneously improving the utilization of computer usage of computing resources such as memory footprint, processing bandwidth, and communications bandwidth to yield higher levels of simultaneously-served users by a single computing platform, thereby reducing the cost of the service to the operator.

At least one of the present inventors realized, as disclosed in the '081 related and incorporated patent application, that the number of projects that even the largest companies can complete in a year is limited due to the manually time intensive effort required, often across multiple departments. These engagements may involve tens of resources for several months whilst data is collected, analyzed, and reviewed by experienced practitioners. Hypothesis generated from executive interviews, observations, and computer generated reports often must be properly validated to achieve a reasonable degree of reliability in order for the business to decide to invest in the associated project and business plans. And, because the time-consuming nature of the data gathering, data preparing, and analysis, businesses struggle to respond in real-time to changes in customer desires and behaviors.

While businesses and organizations had adopted tools such as central customer database systems and financial forecasting tools to reduce the effort of such engagements, data sets often came and still come from non-integrated disparate sources, requiring additional database and programming efforts at the beginning of the engagement.

Further, even with integrated data sets, the process of conducting root cause analysis, validating assumptions, creating hypothesis or conversation models largely rely upon the practitioner(s) who have experience conducting such analysis and can quickly identify relevant problem/opportunity patterns. Lastly, by the time the results have been completed following months of analysis, business factors may have changed such that the results and assumptions are less relevant.

Based on these realizations, at least one of the present inventors has recognized that there is an unmet need in the art for improved and enhanced computer functions to detect, analyze, illustrate, and report customer behaviors while interacting with a business enterprise and the technology that represents the enterprise, to recommend responses to those behaviors to improve the outcomes experienced by the customer, and to measure the change in those behaviors and outcomes to verify or invalidate the modifications to the enterprise.

As disclosed in the '081 related invention patent application, the inventor devised an improved data processing system that continuously analyzes and automates a process of identifying statistically significant patterns of customer behavior linked to a specific set of customer outcomes and presenting these visually in a graph with linkages to the root causes, customer events, each step in the customer behavior, and the customer outcome. The improved computing system of the '081 related invention provides a set of hypotheses and recommendations based on the pattern matching solutions in a computer database and allows the user of the system to simulate the anticipated outcomes.

In the discussion of FIGS. 9-13, the blocks and arrows represent the relationships between the improved data processing systems and the customer behaviors and process flows that are relevant to identifying common customer behavior patterns that correlate to business and customer outcomes and relate to a given set of root causes, according to the methods and processes of the '081 related invention. The '081 related invention pertains to a method and system automating a process of identifying and analyzing the relationships between root causes that drive events that cause customer behaviors related to a business or customer outcome that is typically composed of one or more tasks. As such, various embodiments according to the '081 related and incorporated patent application are able to automatically and continuously, in real-time in some embodiments, analyze these relationships and to then make specific observations and recommendations based on an expert database, thereby reducing the time a cost of conducting this analysis manually.

Figure 9:
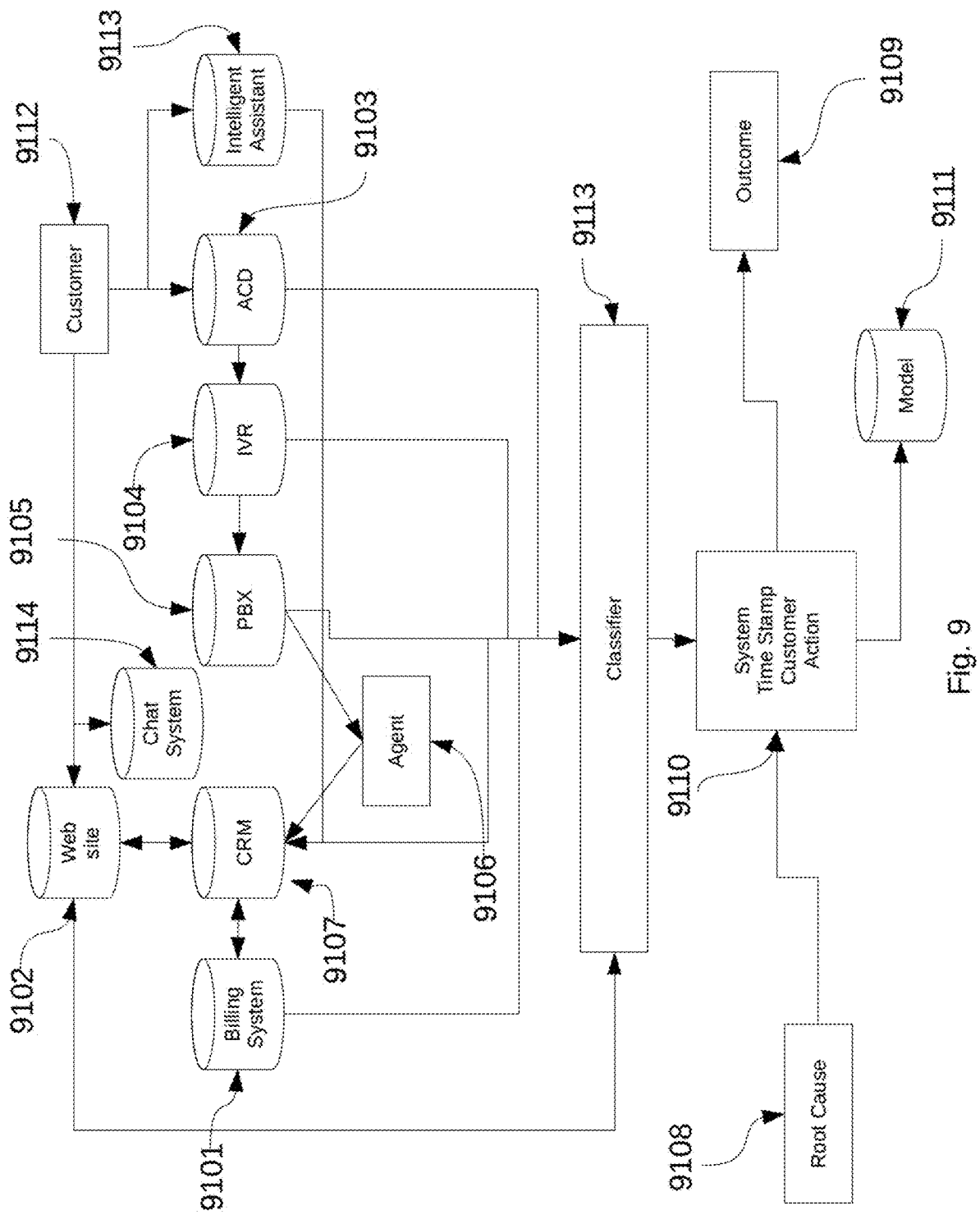
FIG. 9 illustrates an exemplary arrangement, according to the invention disclosed in the related and incorporated U.S. patent application Ser. No. 16/210,081, of computing components and elements to leverage disparate systems and data sources.

Referring now to FIG. 9, illustrates how an improved data processing system according to the '081 related and incorporated patent application leverages disparate systems that record customer events to identify customer behavior linkages between root causes and customer outcomes into predictive models. The exemplary arrangement of computing components, machine-performed logical processes, and communications networks in FIG. 9 include, but are not limited to, data processing systems that are often present within an organization, such as a billing system 9101 that stores information related to a customer's bill, a web site 9102 that customers 9112 can access to view information about a product or service, access their bill, and conduct customer self-service tasks, and a Customer Relationship Management (CRM) system 9107 that stores information regarding customer activity and interactions with the organization.

For customer interactions that involve speaking with an agent 9106, calls usually terminate into an Automatic Call Distributor (ACD) 9103 where the customer may be routed to an Interactive Voice Response (IVR) 9104 system so that the customer has the option for self-service, or directly to an available agent.

Customers may also interact with the organization via an Intelligent Assistant 9113 such as Amazon Alexa™, Google Home™, or Facebook Messenger™ for self-service which accesses the customer's information in the CRM system 9107. In cases where the customer needs to speak directly to an agent, the call is routed to an agent whose phone is connected to a Private Branch eXchange (PBX) 9105 in a call center, who is able to facilitate the desired customer and/or business outcome to address the root cause.

Some notable key elements of the improved data processing system, according to the '081 related and incorporated patent application, include a classifier 9113, which provides raw data for a model 9111 to identify and correlate common customer paths to outcomes 9109 related to a root cause 9108. Given that the customer behaviors to be analyzed are stored across disparate data processing systems mentioned previously, a beneficial improvement to the computing technology provided by some embodiments of the '081 related invention is its ability to automatically identify and correlate customer behaviors from these disparate systems. This is done, in at least one embodiment, by automatically identifying similarities in the data sets and then inferring relationships. The primary elements of correlation may include a unique customer identifier, one or more session identifiers, and one or more event or record date/time stamps. These elements, along with the content of the data element, may allow the embodiment to create a digital representation or model of customer behavior paths over time.

Customer paths are aggregated, by the improved computing system, by one or more criteria including a unique customer identifier, classes of customers based on attributes such as customer type, lifetime value, total spend, outcomes, events, and root causes. The most common statistically significant paths are automatically compared, by the improved computing system, against one or more domain models 9111 which may be stored by the data processing system. The domain models are able to create observations and their associated recommendations to improve customer and business outcomes based on previous outcomes related to the same or similar customer paths. These domain models may be supplied by domain experts or created by the organization wishing to use the '081 related invention to improve customer outcomes. The models are automatically improved based on actual outcomes against the predicted outcomes generated by the system.

Figure 10:
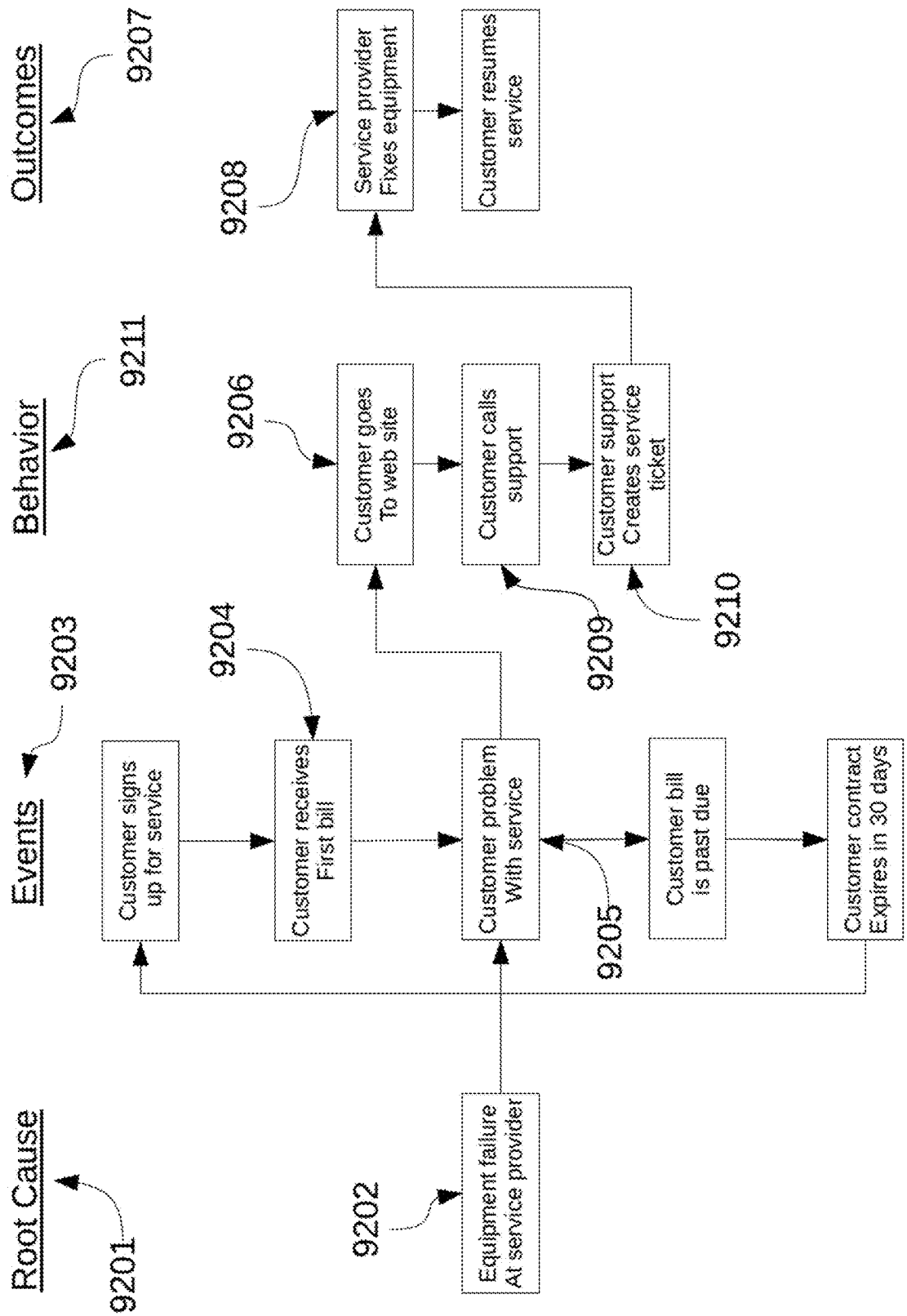
FIG. 10 shows, for reference, a hypothetical flow of user experiences interacting with the technology which represents a business entity's enterprise.

FIG. 10 shows a sample method or process, by the improved computing system, according to the, as disclosed in the '081 related and incorporated patent application, of how a root cause drives one or more events that result in customer behaviors that cause a customer outcome. This example process includes some or all of an identification of a root cause 9201, a computer record of a series of related events 9203, a plurality of examples of related customer or provider behaviors 9211, and their associated outcomes 9207. For example, given a root cause 9201 such as an equipment failure 9202 that causes an interruption of a customer's service 9205 which leads the customer to visit the service provider's web site 9206, then event records indicate that those customers with that problem subsequently call customer support 9209 who, most often, creates a service ticket 9210 in the service provider's system, which most often results in the service provider repairing the customer's equipment 9208.

Figure 11:
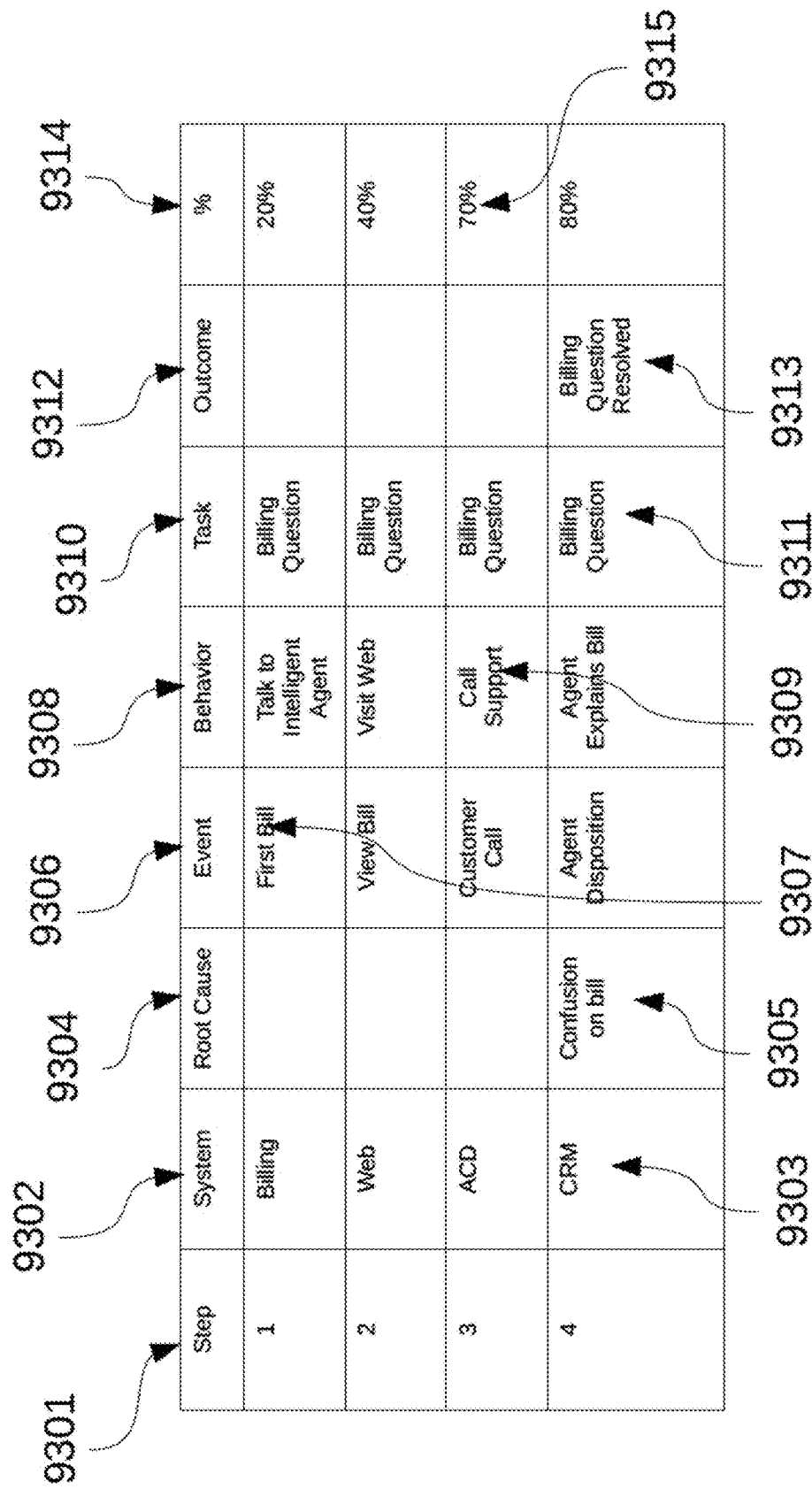
FIG. 11 presents an exemplary data structure embodiment for a classifer, according to the invention disclosed in the related and incorporated US patent application Ser. No. 16/210,081, to collect and correlate disparate system events.

FIG. 11 provides details of an exemplary embodiment according to the '081 related invention for how the classifier of FIG. 9 collects, structures and correlates disparate system event records for customers over time and documents the customer behaviors and tasks associated with those events and behaviors and eventually correlates them to a customer outcome and root cause and measures the percentage of customers that were affected by that specific set of steps. This exemplary embodiment collects and analyzes customer behaviors 9308 from disparate systems 9302 such as CRM 9303 across multiple steps 9301 that may occur over the course of time to achieve a given outcome 9312 such as resolving a billing question 9313. If the digital model accurately predicts the root cause 9304 as described in the FIG. 1, such as a customer's confusion of their first bill 9305, in addition to tying the steps to the related task 9310 performed by the customer or the agent which occurs when the customer calls the organization 9309, such as answering the billing question 9311, then the automated system will be able to accurately predict what the dominant customer paths will be and their statistical significance 9314 given an event 9304 such as a customer receiving their first bill 9307. In this specific example, the automated and improved data processing system would be able to make the observation that a significant percentage, such as 80%, of customers had their billing question resolved 9315. Based on the system generated observation, an associated recommendation and associated estimated benefits would be made, which are further detailed in FIG. 13.

Figure 12:
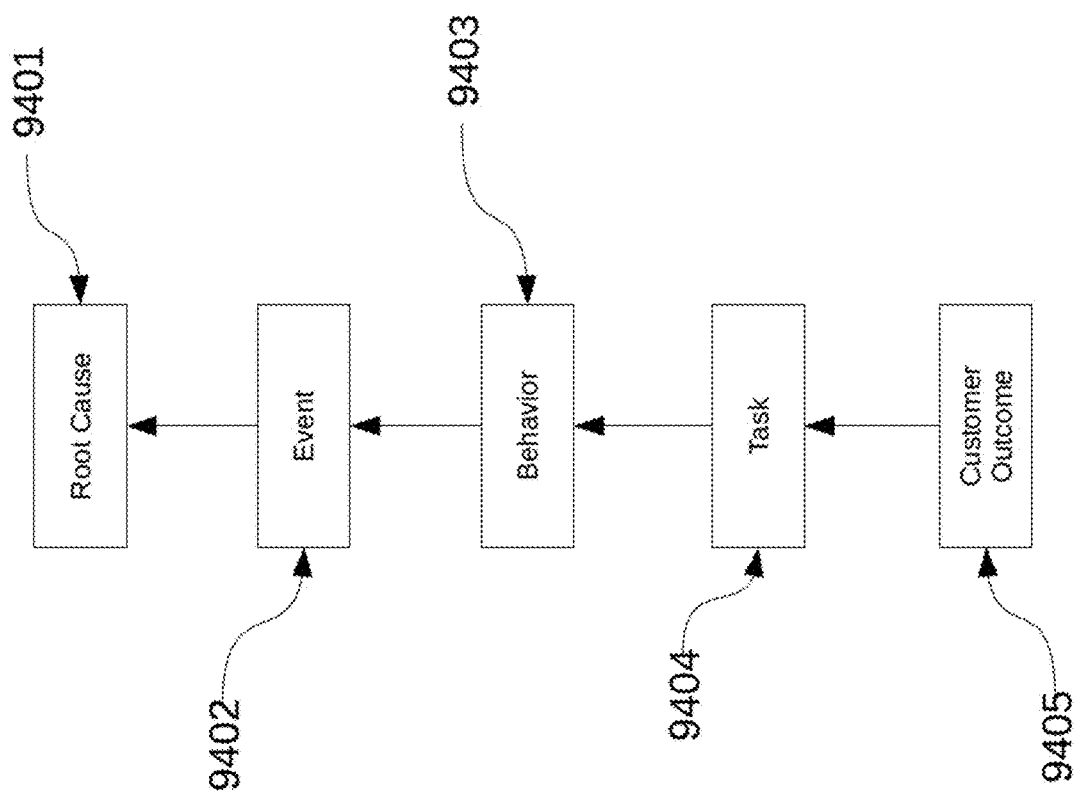
FIG. 12 illustrates an exemplary method, according to the invention disclosed in the related and incorporated U.S. patent application Ser. No. 16/210,081, for dominant path analysis.

FIG. 12 illustrates an exemplary embodiment according to the '081 related invention of a dominant path analysis process, which starts with a given customer outcome and analyzes customer interactions to identify the most common customer paths that occur to achieve a given outcome given an event and root cause. FIG. 12 further illustrates a path analysis process which at least one embodiment of the '081 related invention automatically performs. It begins with a given customer or business outcome 9405 and analyzes the data from the systems previously mentioned in FIG. 9 to identify all tasks 9404 that were performed by the agent, the Intelligent Agent, or the IVR on behalf of the customer to achieve the outcome. Each step taken to perform the task and the associated customer behaviors 9403, examples of which are contained in FIG. 10 and FIG. 11, are further identified and counted such that a tree containing the most statistically significant customer behaviors can be accurately traced to the given outcome. The improved data processing system then attempts to identify the event(s) 9402 and associated root cause(s) 9401 through direct correlations or probabilistic deduction based on previous instances of the same or similar event 9402 and the associated root cause 9401 analysis.

Figure 13:
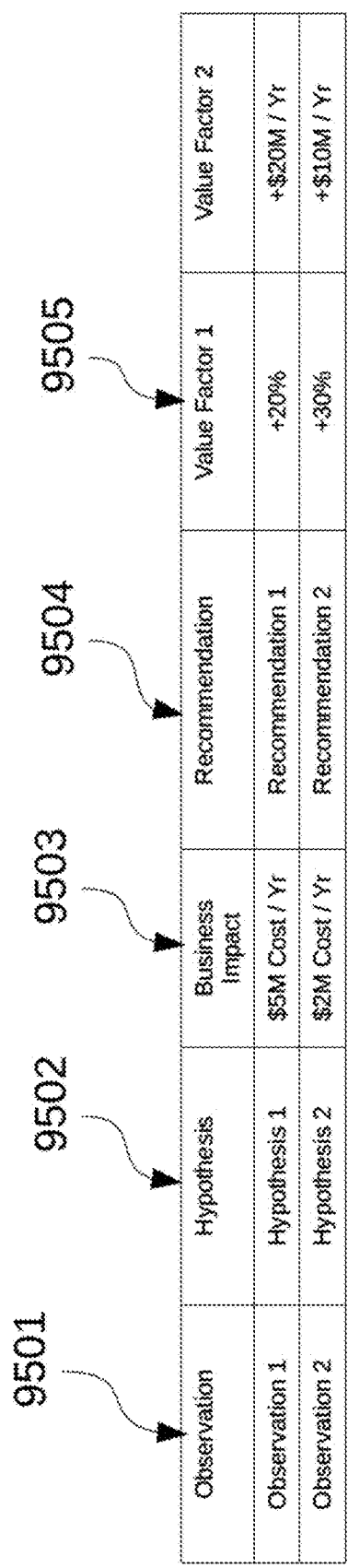
FIG. 13 sets forth an exemplary results report, according to the invention disclosed in the related and incorporated U.S. patent application Ser. No. 16/210,081, including observations, hypothesis, recommendations, and their estimated impacts resulting from exemplary methods of analysis relative to the examples shown in FIGS. 11 and 12.

FIG. 13 shows an exemplary embodiment of the results of at least one embodiment of the '081 related invention which are communicated to a user or another computer process, including the improved data processing system's observations, hypothesis, recommendations, and their estimated impacts resulting from the analysis in FIG. 11 and FIG. 12. This sample output of the recommendation 9504 and benefits model 9505 that matches the hypothesis 9502 are based on the observations 9501 made by the system based on the pattern analysis depicted in FIG. 11 and FIG. 4. as described previously. The associated business impact 9503 of the hypothesis is based upon the statistical significance of the observation as contained in FIG. 11. The output contained in FIG. 13 is comprised of data based upon domain experts their input sample outputs for a given domain based on their experience and the expected performance of the recommendations.

Training of Chatbots from a Corpus of Human-to-Human Chats

Having established a baseline functionality and terminology in the foregoing paragraphs, we now turn our attention to the disclosure of the inventive processes and systems for training a AI-based chatbot using a corpus of text-recorded human-to-human chats or conversations.

Figure 14:
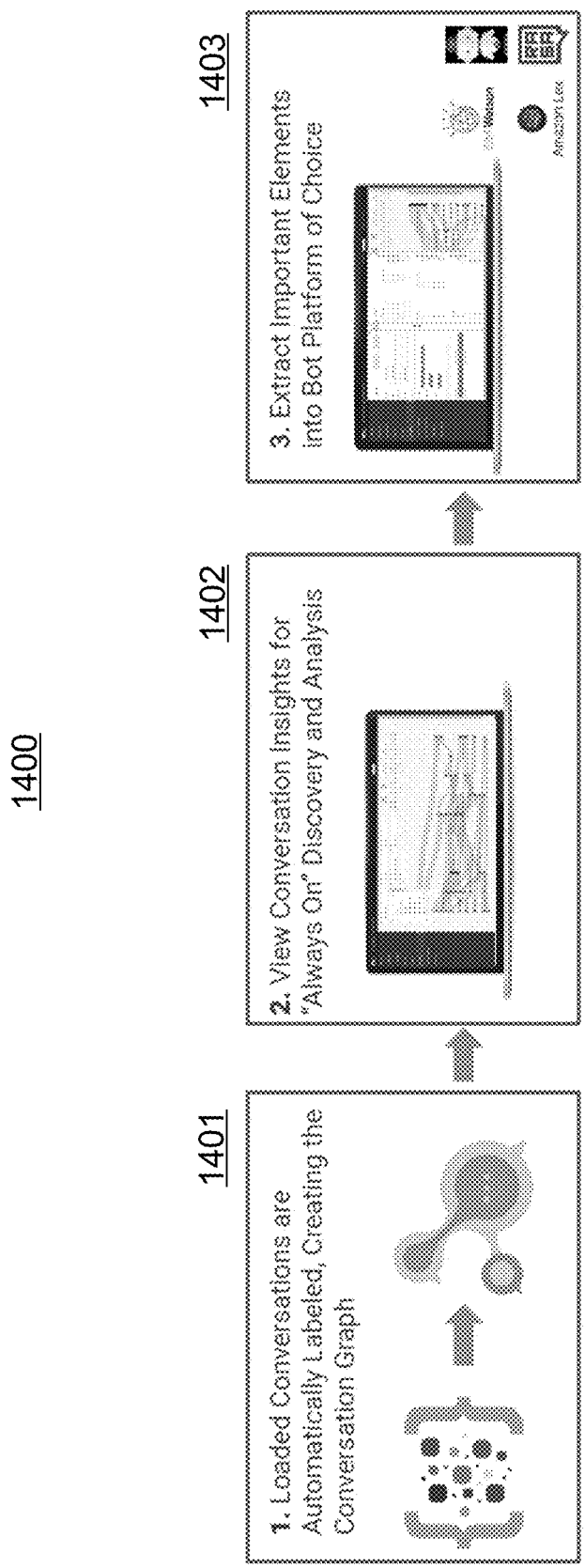
FIG. 14 illustrates a high-level process according to the present invention.

FIG. 14 illustrates a high-level process 1400 according to the present invention in which:
  (a) 1401 conversations are loaded from a corpus of real conversations, automatically labeled using a process such as that described in the foregoing paragraphs (or a suitable alternative), and a conversation graph is automatically created using a process such as that described in the foregoing paragraphs (or a suitable alternative);
  (b) 1402 a display of conversation paths which meet a user-selectable minimum path dominance is produced and shown to one or more human supervisors, such as a Sankey-type of display, using a process such as that described in the foregoing paragraphs (or a suitable alternative), to enable insight discovery by the human supervisor user; and
  (c) 1403 under user command and selection, specific elements from the displayed conversation representation are extracted and exported to one or more third-party chatbot platforms such as, but not limited to, the IBM Watson™, Amazon Lex™, and/or Rasa open-source natural language processing chatbot platform, to accomplish the initial training of the AI model for the chatbot platform.

Figure 15:
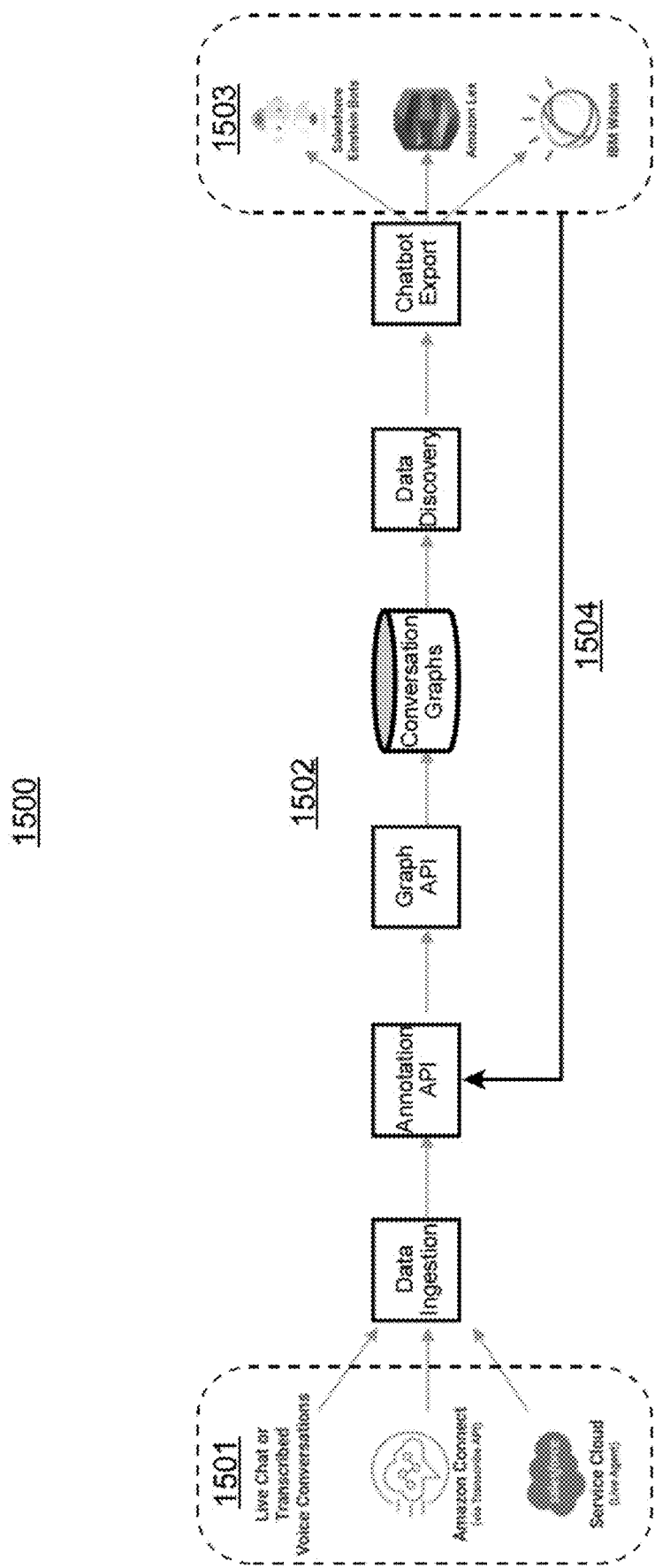
FIG. 15 illustrates an example production pipeline according to the present invention.

Turning to FIG. 15, more details of processes and systems according to the present invention are illustrated for one example embodiment 1500 of a production pipeline for the conservation data flow. Text-based conversation data 1501, such as, but not limited to, transcribed voice conversations, text-recorded text chats, or other sources of text-based conversation data, is received and ingested into the production pipeline 1502. The conversations are annotated and graphs are generated, using a process such as that described in the foregoing paragraphs (or a suitable alternative), and the graphs are collected into one or more databases. Data discovery is performed in order to train the initial AI models, which are then exported into one or more chatbot platform formats 1503. Optimization 1504 is performed using supplemental conversation data collected during use of the AI-based chatbot, wherein the supplemental conversation data is received into the production pipleline 1502 through ingestion or directly into the annotation (labeling) stage.

Figure 16A:
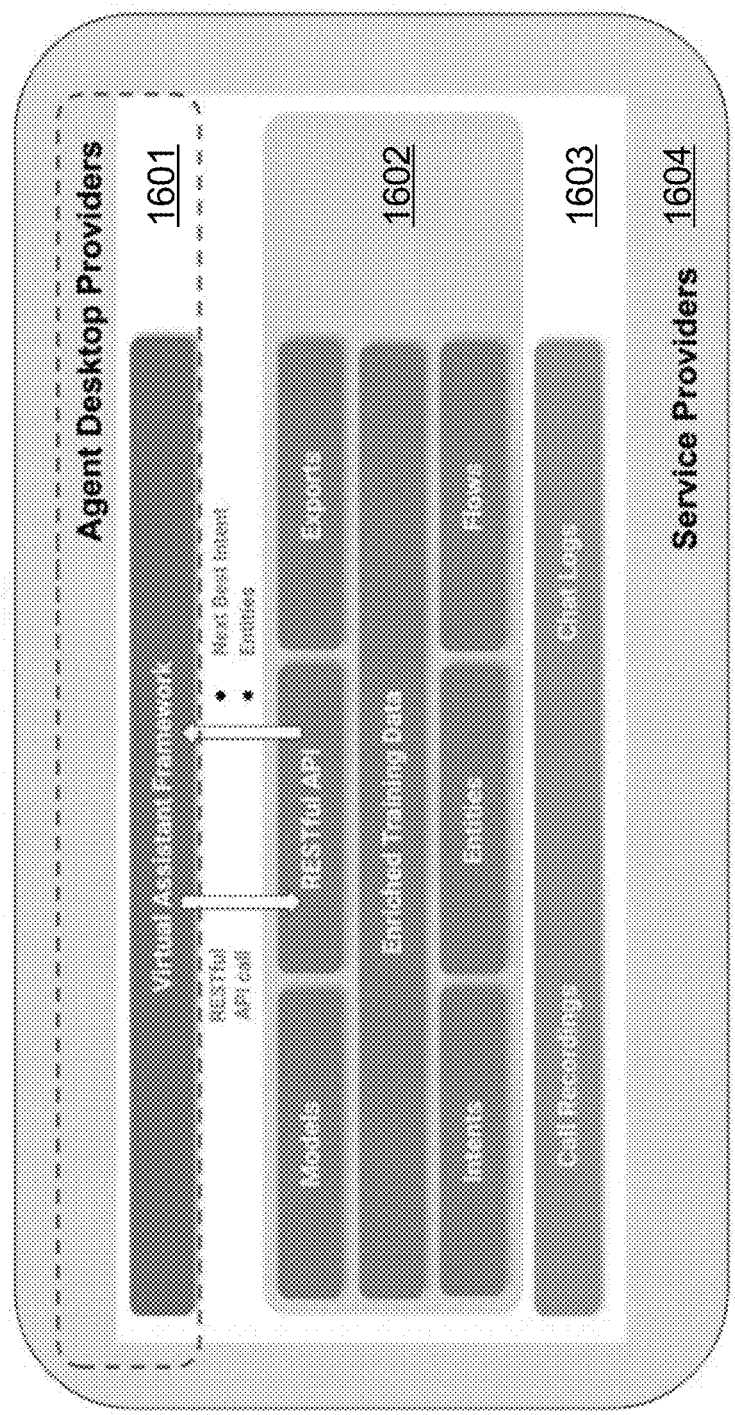
FIGS. 16A and 16B depict example arrangements of systems, components and interfaces for cognition engines according to the present invention.
Figure 16B:
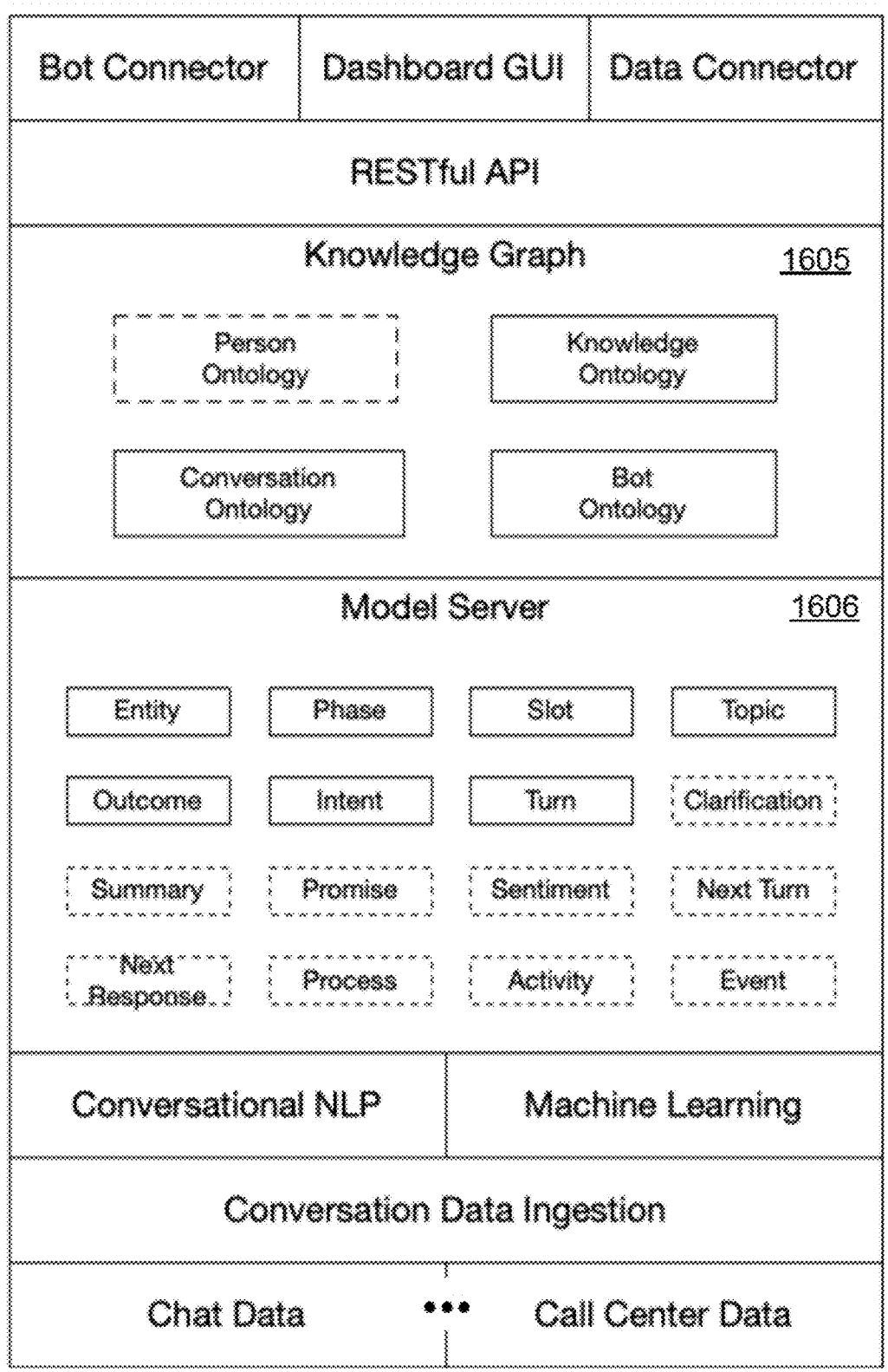

Referring now to FIG. 16A, at least one possible arrangement 1600 of systems and components is illustrated for at least one example embodiment in which a cognition engine 1602 utilizes one or more computer-performed processes and computer systems according to the present invention interfaces to one or more virtual assistant frameworks and agent desktop providers 1601, such as, but not limited to, Salesforce Einstein™, IBM Watson™, Google Dialog Flow™, Kore.ai, Salesforce Service Cloud™, Amazon Connect™ and Genesys™, via RESTful API calls and responses including a projected next-best intent and one or more entities. Data providers, such as, but not limited to, Nice™ and [Verint], may provide call recordings and/or chat logs 1603 to be ingested into the corpus for annotation and further processing as described in the paragraphs herein. Service providers 1604, such as, but not limited to, Accenture, Verizon, and Teleperformance may integrate these plurality of platforms and services. FIG. 16B illustrates a similar arrangement 1600' with additional detail for possible architectural components for the knowledge graphing 1605 and the conversational model server 1606. As shown in this example embodiment, the training pattern for output to an AI-based automated conversation agent may include, but are not limited to, some or all of sample prompts, entities, flows, intents, utterances, outcomes, speech acts, turn groupings, topics, phases, sentiment, clarifying questions or statements, conversation summaries, promises, next best turn, next best action, agent activities, business processes, and events.

As such, in at least one embodiment according to the present invention, text-based conversation data representing a plurality of conversations is ingested into a production pipeline for building a set of coefficients to seed a machine-learning process for one or more AI-based chatbots by annotating the text-based conversation data according to one or more criteria selected from intents, topics, turns, and outcomes. A dominant path modeler, such as, but not limited to, the dominant path modeler disclosed in FIG. 4, determines a plurality of dominant path weights for conversation paths between nodes of turns. A weighted conversation modeler then, using the dominant path weights, creates one or more weighted conversation models, such as, but not limited to, the weighted conversation model illustrated in FIG. 6, using the processes such as, but not limited to, those disclosed in the foregoing paragraphs and in the related and incorporated patent applications. For example, presuming as input a dominant path model data structure in which each dominant path weight (402, 404, 406, and 408) between steps in the paths represent the sums $W_1$-$W_N$ of traversals between steps in the dominant path for each conversation represented in the ingested text-based conversation data, a weighted conversation model is created from each path segment $P_1$-$P_N$ between turns $T_1$-$T_N$ from each dominant path model and the associated weights $W_1$-$W_N$ by converting, such as by normalizing, each dominant path weight in the conversation model 600 such that the percentage of conversation traversals are represented as a percentage of the total traversals from the plurality of processed conversations. The weighted conversation model 600 now contains the normalized likelihoods that future conversations having similar or matching combinations and sub-combinations of intents, topics and outcomes will traverse each available conversation path. Whereas these normalized likelihoods are predictive of future behaviors, they can then be used as seed values for machine-learning coefficients in an AI-based process, such as an AI-based chatbot. Specific available chatbot platforms each require particular machine-learning seed value input data structures, which can be readily generated by a chatbot exporter as shown in FIG. 15.

Further, using text-based conversation records accumulated during subsequent user interactions with the chatbot, such as changes in dominant paths among previously-known intents, topics and outcomes, as well as additions of new intents, topics and outcomes, the machine-learning models and their operating coefficients may be periodically or continuously updated by ingesting the additional text-based conversation data into the production pipeline 1500, performing the forgoing processes on the augmented or supplemented corpus of conversation data, and exporting new (or revised) machine-learning coefficients to one or more AI-based chatbot platforms 1503.

As stated in the foregoing paragraphs, the generated training data can be equally well be exported to and imported by AI-based automated conversational agent system other than chatbots, such as, but not limited to, interactive voice response (IVR) systems, voicebot, prompts, entities, slots and flows. Those ordinarily skilled in the art will recognize that the invention is not interfacing to chatbots, that other embodiments can equally well be used to train other AI-based automated conversation agent systems.

The "hardware" portion of a computing platform typically includes one or more processors accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces may be provided, as well as specialty interfaces for specific applications. If the computing platform is intended to interact with human users, it is provided with one or more user interface devices, such as display(s), keyboards, pointing devices, speakers, etc. And, each computing platform requires one or more power supplies (battery, AC mains, solar, etc.).

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Certain embodiments utilizing a microprocessor executing a logical process may also be realized through customized electronic circuitry performing the same logical process(es). The foregoing example embodiments do not define the extent or scope of the present invention, but instead are provided as illustrations of how to make and use at least one embodiment of the invention.

What is claimed is:

1. A computer-based method to prepare initial training patterns for an Artificial Intelligence (AI) based chatbot comprising:

accessing, by a computer processor, a corpus in computer-readable memory having a plurality of digital weighted conversation models of text-based interlocutory conversations, wherein each digital weighted conversation model contains a plurality of annotations and a plurality of paths, and wherein each of the plurality of the paths in each of the plurality of the digital weighted conversation models is associated with a weight;

selecting, by a computer processor, a plurality of the text-based interlocutory conversations which meet at least one annotation value and in which at least one path meets at least one weight threshold according to the plurality of digital weighted conversation models;

converting, by a computer processor, each weight associated with each of the plurality of the selected conversations into initial training pattern values according to at least one Artificial Intelligence (AI) based automated conversational agent system; and exporting, by a computer processor, the training pattern values to at least one Artificial Intelligence (AI) based automated conversational agent system platform.

2. The computer-based method as set forth in claim 1 further comprising, subsequent to the exporting, receiving, by a computer processor, and subsequent to one or more digital weighted conversation models being added to the corpus, repeating the steps of accessing, selecting, converting and exporting to update the training pattern values.

3. The computer-based method as set forth in claim 1 further comprising, subsequent to the exporting, receiving, by a computer processor, and subsequent to one or more digital weighted conversation models being removed from the corpus, repeating the steps of accessing, selecting, converting and exporting to update the training pattern values.

4. The computer-based method as set forth in claim 1 wherein the accessing further comprises retrieving the plurality of digital weighted conversation models from a corpus stored at least partially in a database.

5. The computer-based method as set forth in claim 1 wherein the accessing further comprises receiving the plurality of digital weighted conversation models from a corpus at least partially via a digital data network.

6. The computer-based method as set forth in claim 1 wherein the selecting of a plurality of the text-based interlocutory conversations which meet at least annotation value further comprises selecting a conversation according to an intent annotation value.

7. The computer-based method as set forth in claim 1 wherein the selecting of a plurality of the text-based interlocutory conversations which meet at least annotation value further comprises selecting a conversation according to a topic annotation value.

8. The computer-based method as set forth in claim 1 wherein the selecting of a plurality of the text-based interlocutory conversations which meet at least one annotation value further comprises selecting a conversation according to an outcome annotation value.

9. The computer-based method as set forth in claim 1 wherein the selecting further comprises providing a prompt to a user on a user interface device of a computer to select one or more illustrated paths.

10. The computer-based method as set forth in claim 9 wherein the selecting of a plurality of the text-based interlocutory conversations in which at least one path meets at least one weight threshold according to the plurality of digital weighted conversation models further comprises displaying a representation the paths and weights to enable the user to select paths having a minimum weight.

11. The computer-based method as set forth in claim 9 wherein the selecting of a plurality of the text-based interlocutory conversations which meet at least one annotation value further comprises selecting a displayed conversation according to a displayed intent annotation value.

12. The computer-based method as set forth in claim 9 wherein the selecting of a plurality of the text-based interlocutory conversations which meet at least one annotation value further comprises selecting a displayed conversation according to a displayed topic annotation value.

13. The computer-based method as set forth in claim 9 wherein the selecting of a plurality of the text-based interlocutory conversations which meet at least one annotation value further comprises selecting a displayed conversation according to a displayed outcome annotation value.

14. The computer-based method as set forth in claim 1 wherein the AI-based automated conversational agent system further comprises one or more systems selected from the group consisting of a chatbot, an interactive voice response (IVR) systems, and a voicebot, and wherein the training pattern comprises one or more outputs selected from the group consisting of a sample prompt, an entity, a flow, an intent, an utterance, an outcome, a speech act, a turn grouping, a topic, a phase, a sentiment, a clarifying question, a clarifying statement, a conversation summary, a promise, a next-best turn, a next-best action, an agent activity, a business process, and an event.

15. A computer program product to prepare initial training patterns for an Artificial Intelligence (AI) based chatbot comprising:

a computer-readable memory which is not a transitory propagating signal per se; and one or more program instructions embodied by the computer-readable memory configured to, when executed by a computer processor, cause the processor to:

access a corpus in computer-readable memory having a plurality of digital weighted conversation models of text-based interlocutory conversations, wherein each digital weighted conversation model contains a plurality of annotations and a plurality of paths, and wherein each of the plurality of the paths in each of the plurality of the digital weighted conversation models is associated with a weight;

select a plurality of the text-based interlocutory conversations which meet at least one annotation value and in which at least one path meets at least one weight threshold according to the plurality of digital weighted conversation models;

convert each weight associated with each of the plurality of the selected conversations into initial training pattern values according to at least one Artificial Intelligence (AI) based automated conversational agent system; and export the training pattern values to at least one Artificial Intelligence (AI) based automated conversational agent system platform.

16. The computer program product as set forth in claim 15 wherein the program instructions further comprise program instructions to, subsequent to the exporting, receiving, and subsequent to one or more digital weighted conversation models being added to the corpus, repeat the instructions of accessing, selecting, converting and exporting to update the training pattern values.

17. The computer program product as set forth in claim 15 wherein the program instructions further comprise program instructions to, subsequent to the exporting, receiving, and subsequent to one or more digital weighted conversation models being removed from the corpus, repeat the instructions of accessing, selecting, converting and exporting to update the training pattern values.

18. The computer program product as set forth in claim 15 wherein the accessing further comprises retrieving the plurality of digital weighted conversation models from a corpus stored at least partially in a database.

19. The computer program product as set forth in claim 15 wherein the accessing further comprises receiving the plurality of digital weighted conversation models from a corpus at least partially via a digital data network.

20. The computer program product as set forth in claim 15 wherein the selecting of a plurality of the text-based interlocutory conversations which meet at least annotation value further comprises selecting a conversation according to an intent annotation value.

21. The computer program product as set forth in claim 15 wherein the selecting of a plurality of the text-based interlocutory conversations which meet at least annotation value further comprises selecting a conversation according to a topic annotation value.

22. The computer program product as set forth in claim 15 wherein the selecting of a plurality of the text-based interlocutory conversations which meet at least one annotation value further comprises selecting a conversation according to an outcome annotation value.

23. The computer program product as set forth in claim 15 wherein the selecting further comprises providing a prompt to a user on a user interface device of a computer to select one or more illustrated paths.

24. The computer program product as set forth in claim 23 wherein the selecting of a plurality of the text-based interlocutory conversations in which at least one path meets at least one weight threshold according to the plurality of digital weighted conversation models further comprises displaying a representation the paths and weights to enable the user to select paths having a minimum weight.

25. The computer program product as set forth in claim 23 wherein the selecting of a plurality of the text-based interlocutory conversations which meet at least one annotation value comprises selecting a displayed conversation according to a displayed intent annotation value.

26. The computer program product as set forth in claim 23 wherein the selecting of a plurality of the text-based interlocutory conversations which meet at least one annotation value comprises selecting a displayed conversation according to a displayed topic annotation value.

27. The computer program product as set forth in claim 23 wherein the selecting of a plurality of the text-based interlocutory conversations which meet at least one annotation value comprises selecting a displayed conversation according to a displayed outcome annotation value.

28. The computer program product as set forth in claim 15 wherein the AI-based automated conversational agent system comprises one or more systems selected from the group consisting of a chatbot, an interactive voice response (IVR) systems, and a voicebot, and wherein the training pattern comprises one or more outputs selected from the group consisting of a sample prompt, an entity, a flow, an intent, an utterance, an outcome, a speech act, a turn grouping, a topic, a phase, a sentiment, a clarifying question, a clarifying statement, a conversation summary, a promise, a next-best turn, a next-best action, an agent activity, a business process, and an event.

29. A system for preparing initial training patterns for an Artificial Intelligence (AI) based chatbot comprising:
- at least one computer processor configured to execute program instructions;
- a computer-readable memory which is not a transitory propagating signal per se; and
- one or more program instructions embodied by the computer-readable memory configured to, when executed by a computer processor, cause the processor to:
  - access a corpus in computer-readable memory having a plurality of digital weighted conversation models of text-based interlocutory conversations, wherein each digital weighted conversation model contains a plurality of annotations and a plurality of paths, and wherein each of the plurality of the paths in each of the plurality of the digital weighted conversation models is associated with a weight;
  - select a plurality of the text-based interlocutory conversations which meet at least one annotation value and in which at least one path meets at least one weight threshold according to the plurality of digital weighted conversation models;
  - convert each weight associated with each of the plurality of the selected conversations into training pattern values according to at least one Artificial Intelligence (AI) based automated conversational agent system; and
  - export the training pattern values to at least one Artificial Intelligence (AI) based automated conversational agent system platform.

30. The system as set forth in claim 29 wherein the program instructions further comprise program instructions to, subsequent to the exporting, receiving, and subsequent to one or more digital weighted conversation models being added to the corpus, repeat the instructions of accessing, selecting, converting and exporting to update the training pattern values.

31. The system as set forth in claim 29 wherein the program instructions further comprise program instructions to, subsequent to the exporting, receiving, and subsequent to one or more digital weighted conversation models being removed from the corpus, repeat the instructions of accessing, selecting, converting and exporting to update the training pattern values.

32. The system as set forth in claim 29 wherein the accessing further comprises retrieving the plurality of digital weighted conversation models from a corpus stored at least partially in a database.

33. The system as set forth in claim 29 wherein the accessing further comprises receiving the plurality of digital weighted conversation models from a corpus at least partially via a digital data network.

34. The system as set forth in claim 29 wherein the selecting of a plurality of the text-based interlocutory conversations which meet at least annotation value further comprises selecting a conversation according to an intent annotation value.

35. The system as set forth in claim 29 wherein the selecting of a plurality of the text-based interlocutory conversations which meet at least annotation value further comprises selecting a conversation according to a topic annotation value.

36. The system as set forth in claim 29 wherein the selecting of a plurality of the text-based interlocutory conversations which meet at least one annotation value further comprises selecting a conversation according to an outcome annotation value.

37. The system as set forth in claim 29 wherein the selecting further comprises providing a prompt to a user on a user interface device of a computer to select one or more illustrated paths.

38. The system as set forth in claim 37 wherein the selecting of a plurality of the text-based interlocutory conversations in which at least one path meets at least one weight threshold according to the plurality of digital weighted conversation models further comprises displaying a representation the paths and weights to enable the user to select paths having a minimum weight.

39. The system as set forth in claim 37 wherein the selecting of a plurality of the text-based interlocutory conversations which meet at least one annotation value comprises selecting a displayed conversation according to a displayed intent annotation value.

40. The system as set forth in claim 37 wherein the selecting of a plurality of the text-based interlocutory conversations which meet at least one annotation value comprises selecting a displayed conversation according to a displayed topic annotation value.

41. The system as set forth in claim 37 wherein the selecting of a plurality of the text-based interlocutory conversations which meet at least one annotation value comprises selecting a displayed conversation according to a displayed outcome annotation value.

42. The system as set forth in claim 29 wherein the AI-based automated conversational agent system comprises one or more systems selected from the group consisting of a chatbot, an interactive voice response (IVR) systems, and a voicebot, and wherein the training pattern comprises one or more outputs selected from the group consisting of a sample prompt, an entity, a flow, an intent, an utterance, an outcome, a speech act, a turn grouping, a topic, a phase, a sentiment, a clarifying question, a clarifying statement, a conversation summary, a promise, a next-best turn, a next-best action, an agent activity, a business process, and an event.

43. An improved data storage and retrieval system for a computer memory, comprising:
   means for configuring said computer memory according to a weighted conversation model data structure, said weighted conversation model data structure comprising:
      at least one conversation topic;
      a plurality of recorded conversation paths associated with each conversation topic; and
      a plurality of recorded interlocutor turns associated with each conversational path within each topic;
      at least one weight value associated with each of the plurality of recorded interlocutor turns, each of the recorded paths, or both recorded turns and recorded paths; and
   means for transforming the conversation model data structure into initial training pattern values according to at least one Artificial Intelligence (AI) based automated conversational agent system.

44. The improved data storage and retrieval system as set forth in claim 43 wherein a conversational path is designated in the weighted conversation model data structure as a dominant path according to at least one weight value in the weighted conversation model data structure.

45. The improved data storage and retrieval system as set forth in claim 43 wherein the weighted conversation model data structure further comprises one or more sub-paths within the plurality of recorded conversational paths.

46. The improved data storage and retrieval system as set forth in claim 43 wherein the each weight value associated with each of the plurality of recorded interlocutor turns is determined according to analysis of a corpus of a text-recorded interlocutor conversations.

47. The improved data storage and retrieval system as set forth in claim 43 wherein the Al-based automated conversational agent system comprises one or more systems selected from the group consisting of a chatbot, an interactive voice response (IVR) systems, and a voicebot, and wherein the training pattern comprises one or more outputs selected from the group consisting of a sample prompt, an entity, a flow, an intent, an utterance, an outcome, a speech act, a turn grouping, a topic, a phase, a sentiment, a clarifying question, a clarifying statement, a conversation summary, a promise, a next-best turn, a next-best action, an agent activity, a business process, and an event.

* * * * *